US011674930B2

(12) United States Patent
Fiseni et al.

(10) Patent No.: US 11,674,930 B2
(45) Date of Patent: Jun. 13, 2023

(54) PROBE HOLDER FOR ULTRASONIC INSPECTION AND METHOD OF MANUFACTURE

(71) Applicant: GE Sensing & Inspection Technologies GmbH, Hurth (DE)

(72) Inventors: Alexander Fiseni, Hurth (DE); Christof Breidenbach, Hurth (DE)

(73) Assignee: GE Sensing & Inspection Technologies GmbH, Hürth (DE)

( * ) Notice: Subject to any disclaimer, the term of this patent is extended or adjusted under 35 U.S.C. 154(b) by 0 days.

(21) Appl. No.: 17/279,729

(22) PCT Filed: Oct. 8, 2019

(86) PCT No.: PCT/EP2019/025335
§ 371 (c)(1),
(2) Date: Mar. 25, 2021

(87) PCT Pub. No.: WO2020/074123
PCT Pub. Date: Apr. 16, 2020

(65) Prior Publication Data
US 2021/0396717 A1 Dec. 23, 2021

Related U.S. Application Data

(60) Provisional application No. 62/743,519, filed on Oct. 9, 2018.

(51) Int. Cl.
*G01N 29/24* (2006.01)
*G01N 29/22* (2006.01)
*G01N 29/28* (2006.01)
*B33Y 80/00* (2015.01)
*B22F 10/12* (2021.01)
(Continued)

(52) U.S. Cl.
CPC ........... *G01N 29/24* (2013.01); *G01N 29/223* (2013.01); *G01N 29/2475* (2013.01);
(Continued)

(58) Field of Classification Search
CPC .... G01N 29/2475; G01N 29/24; G01N 29/25; G01N 29/28; G01N 29/221;
(Continued)

(56) References Cited

U.S. PATENT DOCUMENTS 9,063,068 B2 * 6/2015 Hasegawa ............ A61B 8/4461
2006/0243051 A1  11/2006 Bui et al.
(Continued)

*Primary Examiner* — Suman K Nath
(74) *Attorney, Agent, or Firm* — Mintz Levin Cohn Ferris Glovsky and Popeo, P.C.

(57) ABSTRACT

A method of forming a probe holder includes forming a plurality of layers from at least one body material, wherein adjacent ones of the plurality of layers are bonded to one another to define a body of an ultrasonic probe holder. The body can include a distal end, a chamber, and a fluid channel. The distal end can secure the body to a proximal end of a wear sole. The chamber can be configured to receive an ultrasonic probe and a volume of fluid couplant. A fluid channel extends through a portion of the body to the distal end and the fluid channel can receive a flow of fluid couplant. The plurality of layers can define a first region including a first probe holder material exhibiting a first acoustic or structural property and a second region including a second probe holder material exhibiting a second acoustic or structural property.

18 Claims, 18 Drawing Sheets

(51) Int. Cl.
*B22F 10/14* (2021.01)
*B22F 10/22* (2021.01)
*B22F 10/25* (2021.01)
*B22F 10/28* (2021.01)

(52) U.S. Cl.
CPC .............. *G01N 29/28* (2013.01); *B22F 10/12* (2021.01); *B22F 10/14* (2021.01); *B22F 10/22* (2021.01); *B22F 10/25* (2021.01); *B22F 10/28* (2021.01); *B33Y 80/00* (2014.12)

(58) Field of Classification Search
CPC .. G01N 29/222; G01N 29/223; G01N 29/225; B33Y 80/00; B22F 10/20; Y02P 10/25
See application file for complete search history.

(56) References Cited

U.S. PATENT DOCUMENTS

| | | |
|---|---|---|
| 2007/0044563 A1 | 3/2007 | Sarr et al. |
| 2007/0175282 A1 | 8/2007 | Fetzer et al. |
| 2007/0227250 A1* | 10/2007 | Kennedy .............. G01N 29/225 73/641 |
| 2008/0277198 A1* | 11/2008 | LaWhite ................ G01S 7/521 181/198 |
| 2012/0267981 A1* | 10/2012 | Morris .................. B06B 1/0629 310/314 |
| 2018/0284072 A1 | 10/2018 | Pfortje et al. |
| 2019/0295519 A1* | 9/2019 | Krass ................... G02B 6/0051 |

* cited by examiner

900

Form a plurality of layers from at least one frame material, where adjacent layers are bonded to one another to define a frame of a wear sole, 902

Place a membrane within an aperture of the frame, 904

FIG 9

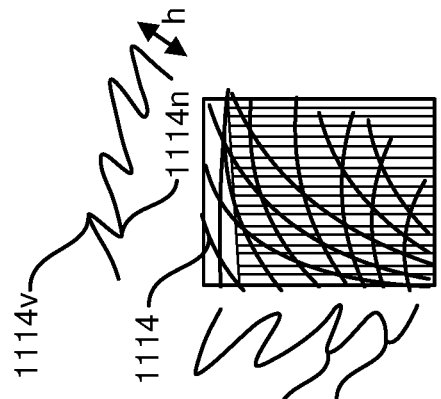
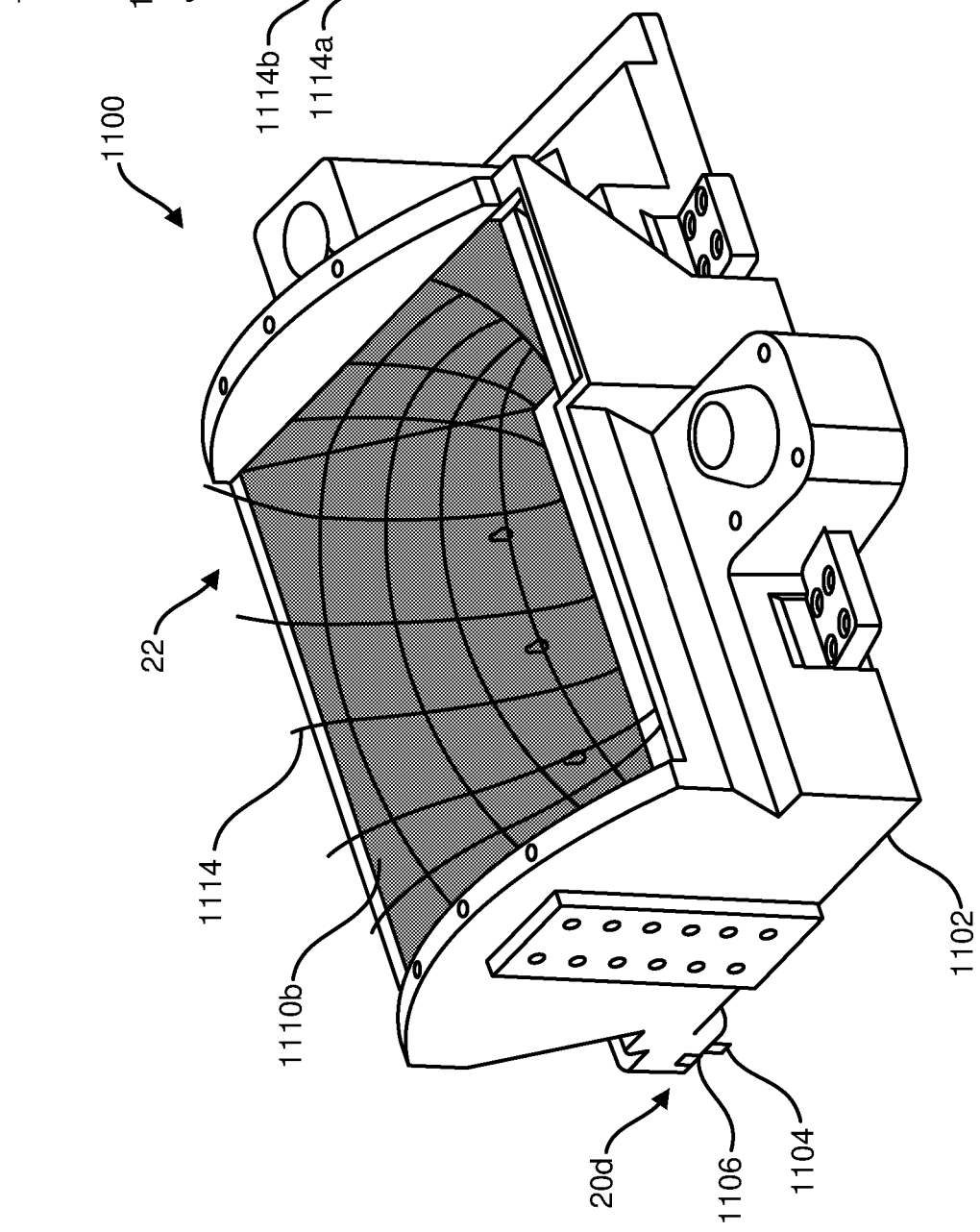
FIG. 13A
FIG. 13B

PROBE HOLDER FOR ULTRASONIC INSPECTION AND METHOD OF MANUFACTURE

BACKGROUND

Ultrasonic inspection can be used to non-destructively detect defects (e.g., cracks, inclusions, voids, etc.) in manufactured articles such as pipes, bars, beams, billets, or other parts that require non-destructive inspection. As an example, an ultrasonic transducer can be used to transmit ultrasonic waves (sound waves) into the inspected part and these transmitted ultrasonic waves can reflect from boundaries within the inspected part (e.g., defects and outer boundaries) back to the ultrasonic transducer. The properties of the reflected ultrasonic waves can be measured by the ultrasonic transducer and subsequently analyzed to identify characteristics of defects detected within the inspected part, including location and size.

SUMMARY

During inspection, ultrasonic transducers can be distanced from the inspected part to avoid wear and dirt accumulation. Because ultrasonic waves are not effectively transmitted through air at the ultrasonic frequencies used in non-destructive testing, an ultrasonic couplant (e.g., a liquid or gel) can be provided within a space between the transducer and the inspected part to facilitate transmission of ultrasonic waves. When the ultrasonic transducer is moved to a new location, the ultrasonic couplant drains from this space and is refilled before inspection is continued. While the delay incurred due to an individual filling is relatively modest (e.g., about 5 sec), it can add up to hours in a high-throughput inspected part manufacturing environment, where hundreds to thousands of pipes are tested daily.

An ultrasonic inspection apparatus can include a probe holder configured to receive an ultrasonic probe and a wear sole configured to contact a target being inspected, such as a rotating pipe. The ultrasonic probe can be fixed in a defined position. As a result, the distance and all angles from the ultrasonic probe to the target can be predetermined and known. The probe holder can be configured to achieve any desired distance and angle.

In general, low deflections of the probe holder can be desirable to ensure good reproducibility of an ultrasonic test procedure. However, in some circumstances, the exterior surface of the pipe can be non-uniform, with high and low regions. If this non-uniformity is not addressed in an ultrasonic test procedure, it can give rise to high dynamics during testing, where the ultrasonic inspection apparatus deflects (e.g., upwards and/or downwards) from a target, neutral position. Accordingly, the probe holder can be designed to be light but strong. Because the probe holder accounts for a significant amount of the total mass of the ultrasonic inspection apparatus, reducing the weight of the probe holder can allow the ultrasonic inspection apparatus to behave as a low unsprung mass.

In general, systems and methods are provided for ultrasonic testing of materials and manufacturing components for a non-destructive ultrasonic inspection apparatus. In certain embodiments, additive manufacturing, also referred to as three-dimensional (3D) printing, can be employed to manufacture components of the ultrasonic inspection apparatus, such as probe holders and/or wear soles. Overall goals of additive manufacturing can include one or more of:

Reduction of the total number of parts. As an example, a conventional probe holder can require approximately 120 parts, while an additively manufactured probe holder can be formed with approximately 5 parts.

Cost and/or weight reduction.

Reduce presence of edges and walls where possible. Unwanted ultrasound can reflect from walls and edges. By use of additive manufacturing, the presence of edges can be reduced or avoided.

Ultrasound noise can be reduced by use of optimized noise-cancelling geometries and wall structures. Destructive ultrasound waves can be created in selected locations to minimize unwanted ultrasound. A reduction in ultrasound noise can increase the signal-to-noise ratio for a given signal.

Optimized couplant flow. Fluid couplants can be employed in ultrasonic testing to facilitate propagation of ultrasound waves between an ultrasonic probe and a target. Through use of cavities that optimize a flow of couplant passing through the probe holder and/or wear sole, the likelihood that turbulence and/or air are present inside the couplant can be reduced. In one embodiment, optimized couplant flow can be achieved through additive manufacturing by forming the probe holder with an increased number of couplant inlets, rather than a few. Additionally, optimized geometries and cross-sections can be further employed for couplant flow distribution exiting the probe holder (e.g., to the wear sole and/or surrounding environment).

Example features that can be formed by additive manufacturing to facilitate these goals can include:

Materials with special strength (e.g., multi-material printing).

Structures with tailored acoustic and fluidic properties (e.g., holes, cavities, and/or imprinted materials).

Inhomogeneous material properties for weight reduction and/or increase of stiffness.

Weight and/or strength optimized topologies.

Surface features to support ultrasonic probes (e.g., absorption of ultrasonic signals).

In an embodiment, a method for forming an ultrasonic probe holder is provided. The method can include forming a plurality of layers from at least one body material. Adjacent ones of the plurality of layers can be bonded to one another to define a body of an ultrasonic probe holder. The ultrasonic probe holder body can include a distal end configured to secure the body to a proximal end of a wear sole, a chamber configured to receive an ultrasonic probe and a first volume of ultrasonic couplant, and a fluid channel extending through a portion of the body to the distal end and configured to receive a flow of fluid couplant.

In another embodiment, the plurality of layers can define a first region including a first probe holder material exhibiting a first acoustic or structural property and a second region including a second probe holder material exhibiting a second acoustic or structural property, wherein the first and second regions occupy different locations within the probe holder body.

In another embodiment, the plurality of layers can define at least one interior-facing surface of the chamber, the interior facing surface including one or more geometric features configured to absorb at least a portion of ultrasonic waves incident thereon.

Embodiments of the geometric features can adopt a variety of configurations. In one aspect, the geometric features can include first triangular cuts that are in a saw tooth configuration and extend approximately straight and parallel to a predetermined axis A. In another aspect, the geometric features can include second triangular cuts that are curved with respect to the axis A.

In another embodiment, the plurality of layers can define one or more attachment features formed on or adjacent to the distal end and configured to secure the probe holder to the distal end of a wear sole.

In another embodiment, the plurality of layers can define a plurality of outlets on at least one interior-facing surface of the first chamber in fluid communication with the fluid channel via a branch.

In another embodiment, a fluid couplant received by the first channel and directed to the first chamber flows can flow laminarly into the first chamber.

In another embodiment, a cross-sectional area of the fluid channel positioned distally of the branch increases as the fluid channel approaches the distal end.

In another embodiment, a fluid couplant received by the first channel and directed to the second end can flow out of the second end laminarly.

In an embodiment, an ultrasonic probe holder is provided and it can include a plurality of layers forming at least one body material. Adjacent ones of the plurality of layers can be bonded to one another to define a body of an ultrasonic probe holder including a distal end, a chamber, and a fluid channel. The distal end can be configured to secure the body to a proximal end of a wear sole. The chamber can be configured to receive an ultrasonic probe and a first volume of ultrasonic couplant. The fluid channel can extend through a portion of the body to the distal end and it can be configured to receive a flow of fluid couplant.

In another embodiment, the plurality of layers can define a first region including a first probe holder material exhibiting a first acoustic or structural property and a second region including a second probe holder material exhibiting a second acoustic or structural property. The first and second regions can occupy different locations within the probe holder body.

In another embodiment, the plurality of layers define at least one interior-facing surface of the chamber, the interior facing surface including one or more geometric features configured to absorb at least a portion of ultrasonic waves incident thereon.

Embodiments of the geometric features can adopt a variety of configurations. In one aspect, the geometric features can include first triangular cuts in a saw tooth configuration and extending approximately straight and parallel to a predetermined axis A. In another aspect, the geometric features can include second triangular cuts that are curved with respect to the axis A.

In another embodiment, the plurality of layers can define one or more attachment features formed on or adjacent to the distal end and configured to secure the probe holder to the distal end of a wear sole.

In another embodiment, the plurality of layers can define a plurality of outlets on at least one interior-facing surface of the first chamber in fluid communication with the fluid channel via a branch.

In another embodiment, a fluid couplant received by the first channel and directed to the chamber can flows into the chamber laminarly.

In another embodiment, a cross-sectional area of the fluid channel positioned distally of the branch can increase as the fluid channel approaches the distal end.

In another embodiment, a fluid couplant received by the first channel and directed to the second end can flow out of the second end laminarly.

DESCRIPTION OF DRAWINGS

These and other features will be more readily understood from the following detailed description taken in conjunction with the accompanying drawings, in which:

FIG. 9 is a flow diagram illustrating one exemplary embodiment of a method of manufacturing a wear sole;

FIG. 13A a side view illustrating one exemplary embodiment of a second geometric feature on an interior facing surface of a probe holder chamber;

FIG. 13B is a magnified view of the second geometric feature of FIG. 13A;

It is noted that the drawings are not necessarily to scale. The drawings are intended to depict only typical aspects of the subject matter disclosed herein, and therefore should not be considered as limiting the scope of the disclosure.

DETAILED DESCRIPTION

Methods, systems, and devices are provided for manufacture of components of ultrasonic inspection systems. Current ultrasonic inspection apparatuses can deliver ultrasonic waves through an ultrasonic couplant and into a target (e.g., a pipe), and measure ultrasonic waves reflected from the target. Each time the ultrasonic inspection apparatus is moved to a new location, the ultrasonic couplant must be replenished, resulting in a delay. n An improved ultrasonic inspection apparatus is provided that includes a probe holder and a wear sole that can be attached and released from a bottom of the probe holder. The probe holder includes a cavity that receives an ultrasonic probe and a first volume of an ultrasonic couplant that extends from the ultrasonic probe to the wear sole. The wear sole retains a second volume ultrasonic couplant, smaller than the first volume of ultrasonic couplant, between itself and the target. As a result, when the improved ultrasonic inspection apparatus is moved from one target to another, the first volume of ultrasonic couplant is retained within the probe holder and only the small second volume of ultrasonic couplant is lost and requires refilling. The wear sole can also be easily replaced when sufficiently worn.

Embodiments of the probe holder and the wear sole can be manufactured by additive manufacturing, also referred to as three-dimensional (3D) printing. In 3D printing, one or more materials can be deposited layer-by-layer to form the probe holder and the wear sole. This manufacturing approach can allow for precise control over the composition and/or geometric features of the probe holder and the wear sole, which can in turn improve the properties of the wear sole. In one aspect, the probe holder and the wear sole can each be formed from one or more materials and/or shapes that demonstrate specific properties, such as increased wear resistance, acoustic properties, fluidic properties, reduced weight, increased stiffness, and increased strength, amongst others. In this manner, an additively manufactured inspection apparatus can be formed at reduced cost, while exhibiting improved acoustic properties and/or longer lifetime. Other embodiments are within the scope of the disclosed subject matter.

Embodiments of the disclosure are discussed herein with respect to ultrasonic detection of defects within targets having the form of pipes. However, a person skilled in the art will appreciate that the disclosed embodiments can be employed to ultrasonically detect defects in other structures and/or geometries without limit. Examples can include bars, billets, rail wheels, and other structures, such as those formed from composite materials.

Figure 1:
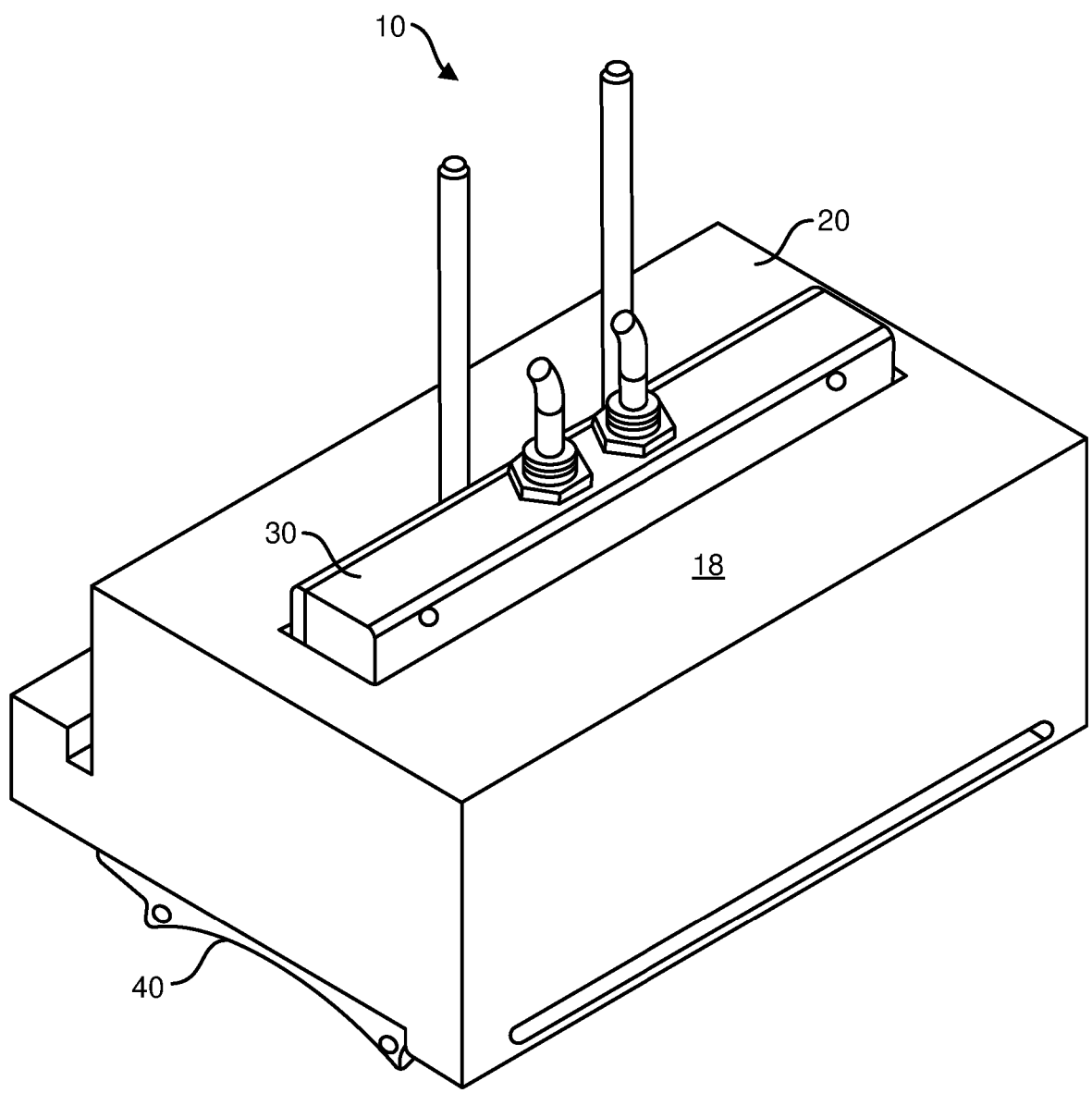
FIG. 1 is a perspective view of one exemplary embodiment of an ultrasonic inspection apparatus including an ultrasonic probe and a probe holder with a removable wear sole.
Figure 2:
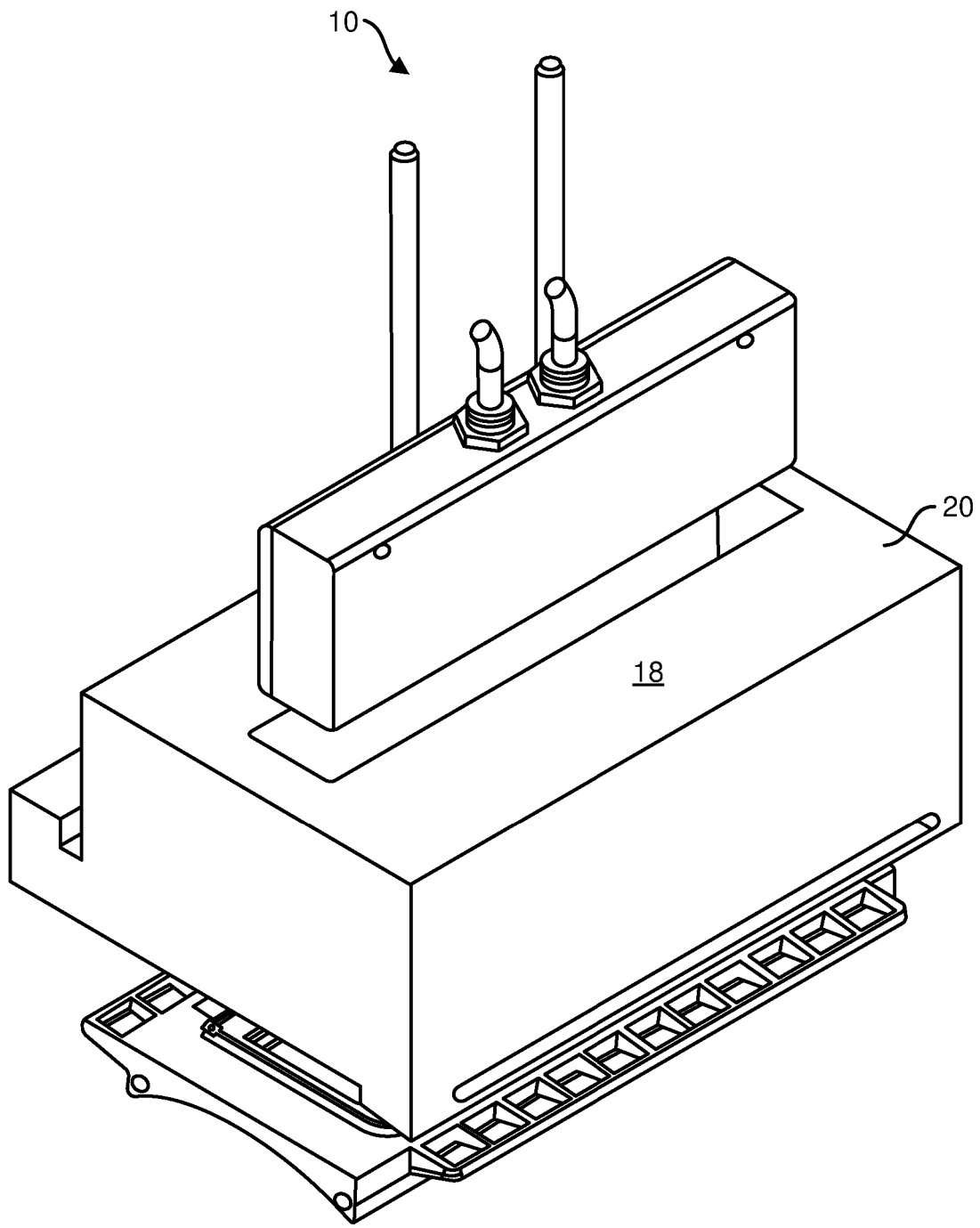
FIG. 2. is a perspective view of the ultrasonic inspection apparatus of FIG. 1 illustrating the ultrasonic probe and wear sole detached from the probe holder.

FIGS. 1-2 illustrate one exemplary embodiment of an ultrasonic inspection apparatus 10. As shown, the ultrasonic inspection apparatus 10 can include a probe holder 20 having an ultrasonic probe 30 and a wear sole 40 mounted thereto. The probe holder 20 can be configured to engage a pipe (not shown) via the wear sole 40 and retain a volume of ultrasonic couplant(s) between the ultrasonic probe 30 and the pipe during inspection. Between inspections, the wear sole 40 can be easily detached from the probe holder 20 for replacement due to wear and accumulation of contaminants (e.g., dirt). As discussed in detail below, the probe holder 20 and wear sole 40 can be configured such that, when the ultrasonic inspection apparatus 10 is moved from one inspected pipe to another, a majority portion of the ultrasonic couplant(s) is retained within the probe holder 20, while a minority portion extending between the wear sole 40 and the pipe is drained. Thus, the time needed to replace the drained ultrasonic couplant(s) can be reduced, as compared to replacing all of the ultrasonic couplant(s). Embodiments of the pipe can include any substantially tubular structure formed by any process and material (e.g., steels, copper and copper alloys, aluminum and aluminum alloys, etc.).

Figure 3:
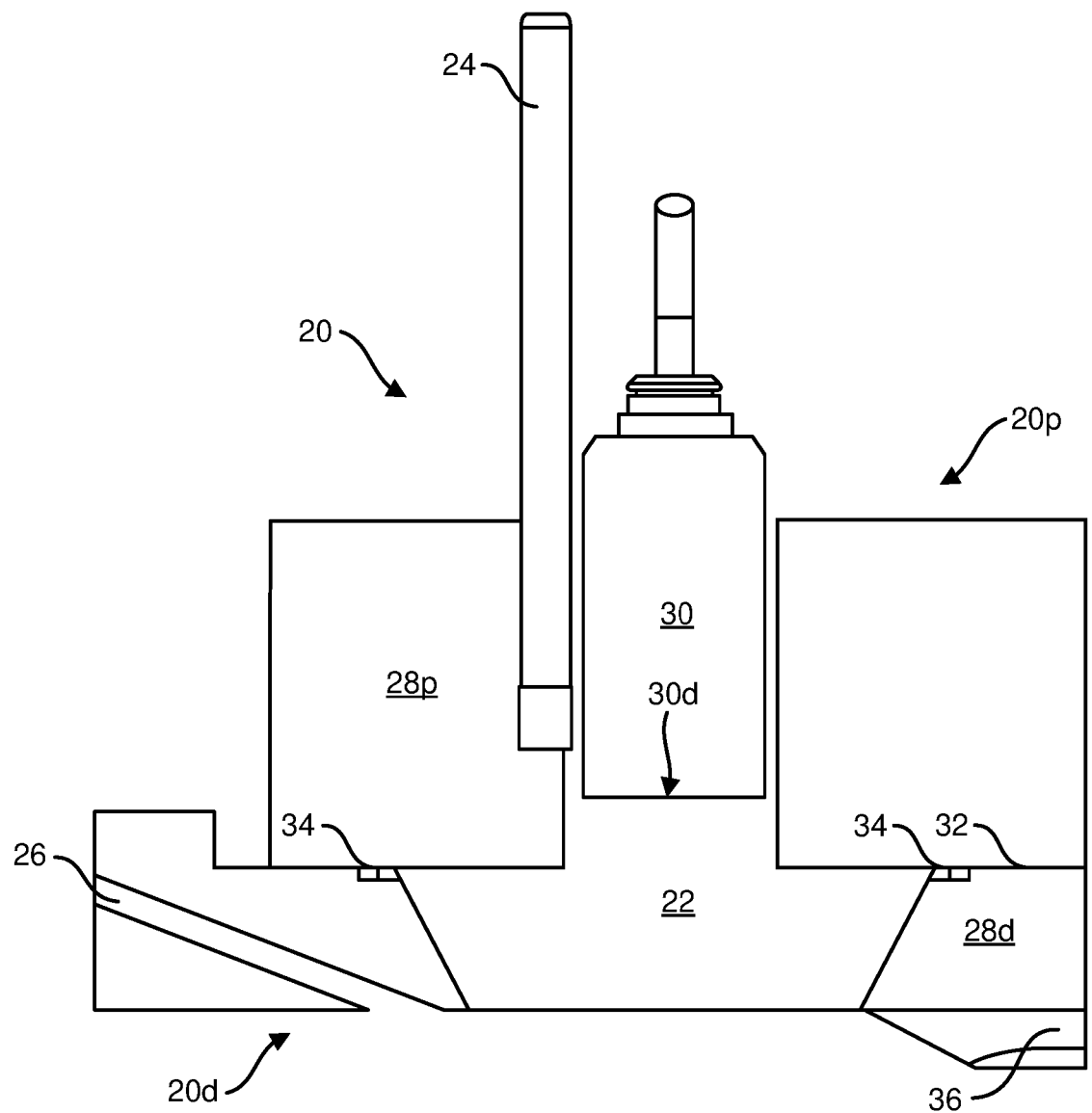
FIG. 3 is a cross-sectional view of the probe holder and probe of FIG. 1.

FIG. 3 is a cross-sectional view illustrating the probe holder 20 and the ultrasonic probe 30 of FIGS. 1-2. As shown, the probe holder 20 can be in the form of a generally rectangular housing or body 18 having a first chamber 22 extending between a proximal end 20p and a distal end 20d. The first chamber 22 can be configured to receive the ultrasonic probe 30 and a first volume of ultrasonic couplant. As shown, a distal end 30d of the ultrasonic probe 30 can be inserted through an opening in the proximal end 20p of the probe holder 20 and secured therein. The distal end 30d of the ultrasonic probe 30 can be positioned within the first chamber 22 at a selected distance from the distal end 20d of the probe holder 20.

The first volume of ultrasonic couplant can be delivered to the first chamber 22 via a first couplant supply 24 (e.g., hoses, pipes, etc.) in fluid communication with the first chamber 22 and a first couplant source (not shown). The first couplant supply 24 can fill the first chamber 22 with the first volume of the first ultrasonic couplant. In FIG. 3, the first couplant supply 24 is illustrated as extending through the proximal end 20p of the probe holder 20. However, in alternative embodiments, the first couplant supply can extend through the probe holder in other directions for fluid communication with the first chamber.

The probe holder 20 can also define a first fluid channel 26 configured to receive a second volume of ultrasonic couplant. The first and second volumes of ultrasonic couplants can be the same ultrasonic couplant or different ultrasonic couplants. As shown, the first fluid channel 26 can extend from a lateral surface of the probe holder 20 to the distal end 20d of the probe holder 20. The first fluid channel 26 can also extend along at least a portion of a length of the probe holder 20. In certain embodiments, the first fluid channel 26 does not fluidly communicate with the first chamber 22. The first fluid channel 26 can be placed in fluid communication with a second ultrasonic couplant source (not shown) and can direct a flow of ultrasonic couplant through the probe holder 20 to the distal end 20d.

In certain embodiments, the probe holder 20 can be formed from multiple components. For example, the probe holder 20 can include a proximal portion 28p sealingly engaged to a distal portion 28d at a joint 32. The joint 32 can include an interface between opposed surfaces of the proximal and distal body portions and one or more seals 34 positioned about the circumference of the first chamber 22 at the interface. The seals 34 can inhibit leakage of the first volume of ultrasonic couplant when retained within the first chamber 22.

Figure 4:
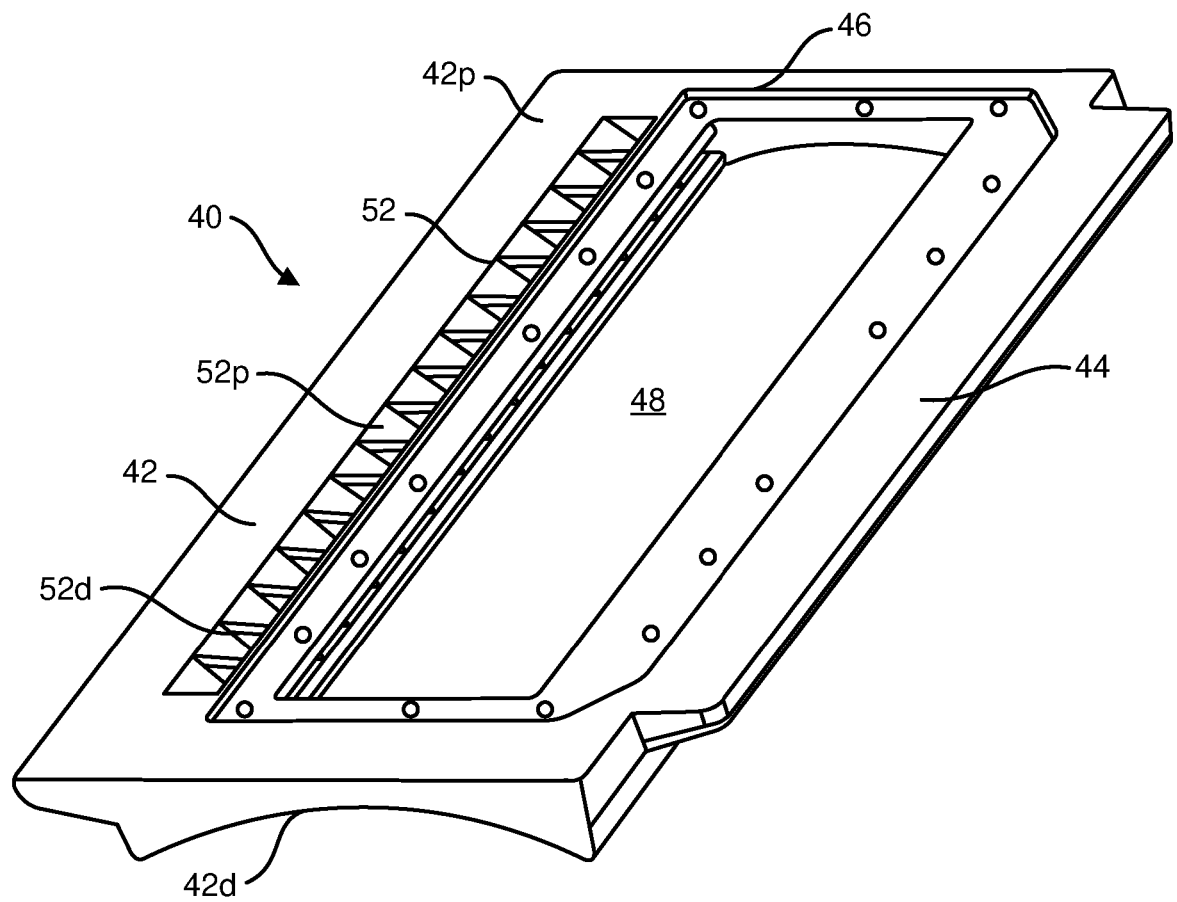
FIG. 4 is a perspective view of the wear sole of FIG. 1.
Figure 5:
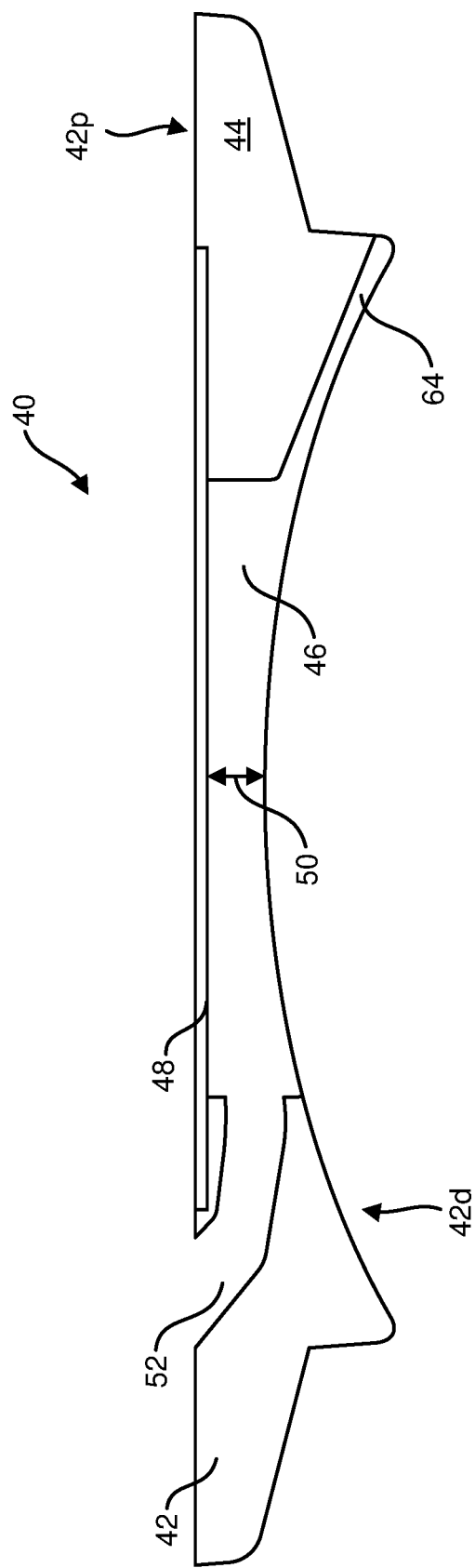
FIG. 5 is a cross-sectional view of the wear sole of FIG. 4.

FIGS. 4-5 illustrate the wear sole 40 in greater detail. In an exemplary embodiment, the wear sole 40 can include a frame 42 (e.g., a generally rectangular frame) having a proximal surface 42p, a distal surface 42d, and an aperture 46 extending therethrough. The proximal surface 42p of the frame 42 can be configured to mate to the distal end 20d of the probe holder 20. The frame 42 can also include a tab 44 extending laterally on and/or adjacent to the proximal surface 42p. The tab 44 can be dimensioned for receipt within a slot 36 formed in the distal end 20d of the probe holder 20. As an example, the tab 44 can be secured within the slot 36 by an interference fit, allowing the wear sole 40 to be quickly engaged or disengaged from the probe holder 20. In alternative embodiments, other mechanisms (e.g., mechanical fasteners, adhesives, etc.) can be employed in place of, or in combination with, the slot 36 and tab 44 for coupling the wear sole 40 to the probe holder 20.

The distal surface 42d of the frame 42 can be configured to engage a pipe. In certain embodiments, the distal surface 42d can have a radius of curvature that is the same, as or approximately equal to, that of a pipe to be inspected. In other embodiments the distal surface 42d can adopt any other shape (e.g., rectilinear, curved, arbitrary, etc.) suitable for mating with a surface of a pipe or other object to be inspected. For example, the wear sole can be a stiff system with respect to one fixed geometry of a test piece or a flexible system as is described in International Patent Publication No. WO 2013/127871, which is incorporated by reference herein in its entirety. While not shown, further embodiments of the frame 42 can include a plurality of recesses formed in the distal surface 42d that retain a wear resistant material therein (e.g., hardened steels, ceramics, etc.) to enhance the durability and service life of the wear sole 40.

The frame 42 can also include a membrane 48 positioned within the aperture 46. In certain embodiments, the membrane 48 can be proximally offset from the distal surface 42d of the frame 42 (e.g., flush mounted with respect to the proximal surface 42p) and can define a second chamber 50 distal to the membrane 48. As shown, the second chamber 50 can be bounded by side walls of the aperture 46 and bounded proximally by the membrane 48. That is, the second chamber 50 can be open to the distal surface 42d of the frame 42. The membrane 48 can also seal the second chamber 50 from the first chamber 22 when the wear sole 40 is coupled to the probe holder 20.

This configuration of the inspection apparatus 10 can significantly reduce the time required for ultrasonic inspection. As discussed in greater detail below, when the inspection apparatus 10 is moved from one inspection location to another, the first volume of ultrasonic couplant received within the first chamber 22 can be retained within the first chamber 22 rather than being drained from the first chamber 22. Thus, only ultrasonic couplant received within the second chamber 50 (e.g., a second volume of ultrasonic couplant) is drained and refilled between ultrasonic inspection runs performed at different test locations. As a result, a refilling time between ultrasonic inspection runs can be reduced.

In certain embodiments, the membrane 48 can be formed from a material having selected acoustic and/or mechanical properties. As an example, the membrane 48 can be formed from a material whose acoustic impedance is matched with ultrasonic couplant(s) in contact with the membrane 48 to minimize reflections and absorptions at interfaces between the membrane and ultrasonic couplant(s). In certain exemplary embodiments, the membrane material can be a material that is invisible or near invisible when used with a selected couplant, such that the material does not reflect ultrasound from the surface and does not absorb ultrasound when the waves pass therethrough, or at least minimizes reflection and absorption. In further embodiments, the membrane 48 can be formed from a mechanically rigid material. It can be desirable for the membrane 48 to be substantially rigid, undergoing less than a selected amount of deflection in response to forces exerted upon the membrane 48 due to ultrasonic couplant(s) in service (e.g., fluid flow pressure, force of gravity, etc.). Accordingly, the membrane 48 can possess an elastic modulus that limits the deflection of the membrane 48 to less than the selected amount.

By way of non-limiting example, suitable membrane materials include, but are not limited to, polymers, polymer blends, and rubber materials, such as polyethylene, polypropylene, polyvinylchloride, polystyrol, polytetrafluorethylene, polymethylmethacrylat, polyacrylnitril, polyacrylamide, aramides, polyetherketones, polyethylenglycol, polyurethane, silicons or poly(organo)siloxane, thermoplastic elastomers, melamine resin, polyacrylate rubber, ethylene-acrylate rubber, polyester urethane, bromo isobutylene isoprene, polybutadiene, chloro isobutylene isoprene, polychloroprene, chlorosulphonated polyethylene, epichlorohydrin, ethylene propylene, ethylene propylene diene monomer, polyether urethane, perfluorocarbon rubber, fluoronated hydrocarbon, fluoro silicone, fluorocarbon rubber, hydrogenated nitrile butadiene, polyisoprene, isobutylene isoprene butyl, acrylonitrile butadiene, butyl rubber, styrene butadiene, styrene ethylene butylene styrene copolymer, polysiloxane, vinyl methyl silicone, acrylonitrile butadiene carboxy monomer, styrene butadiene carboxy monomer, thermoplastic polyether-ester, styrene butadiene block copolymer, and styrene butadiene carboxy block copolymer. One exemplary membrane material is Aqualene™, manufactured by Innovation Polymers of Kitchener, Ontario, Canada.

Figure 6A:
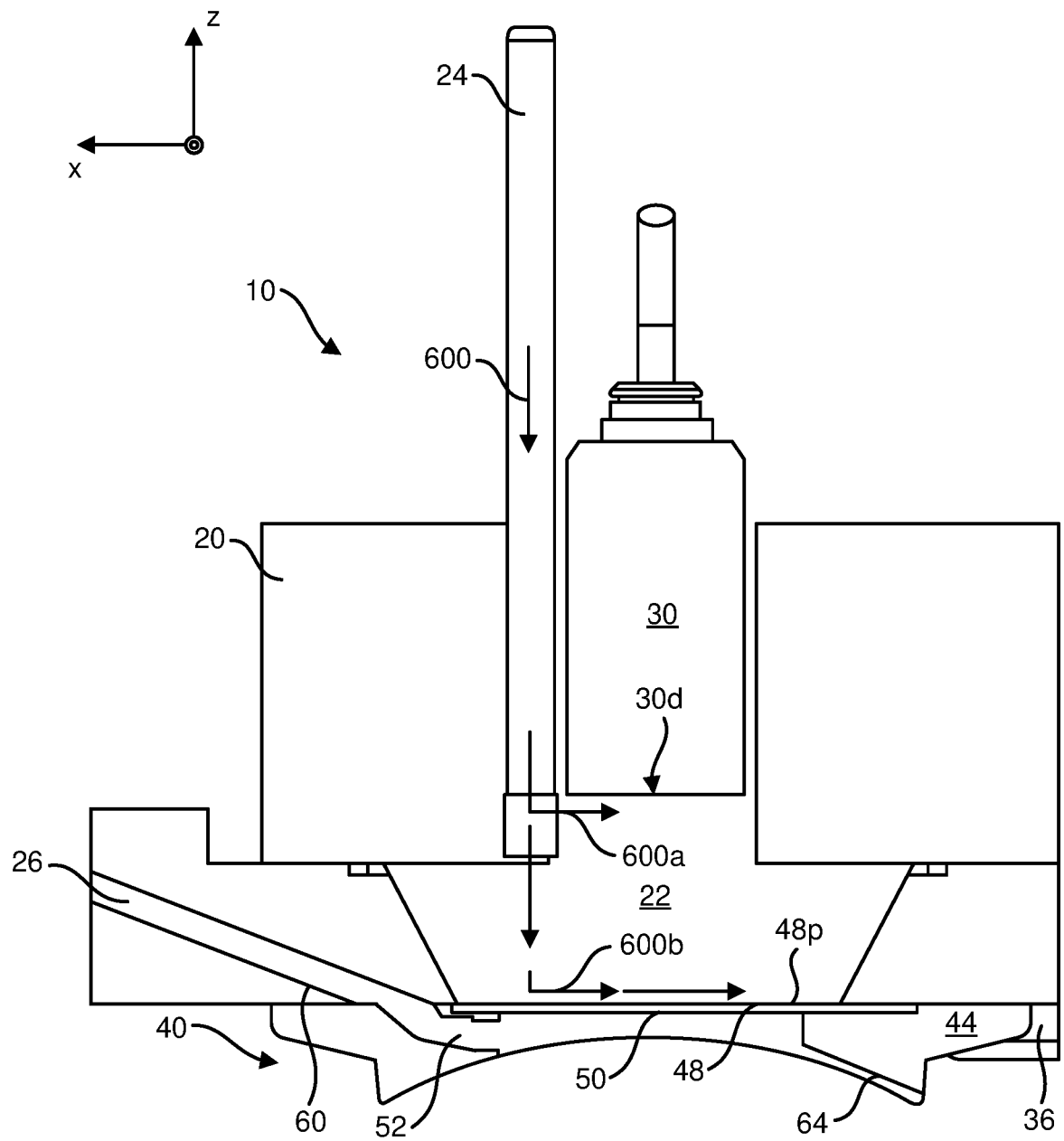
FIGS. 6A and 6B are cross-sectional views of the ultrasonic inspection apparatus of FIG. 1.

The frame 42 can also be configured to receive an ultrasonic couplant and deliver the ultrasonic couplant to the second chamber 50. The second chamber 50 can be in fluid communication with a second fluid channel 52 extending through the frame 42 (e.g., from the proximal surface 42p of the frame 42 to the second chamber 50). The second fluid channel 52 can extend along at least a portion of the length of the aperture 46. When the second fluid channel 52 is placed in fluid communication with a source of the second ultrasonic couplant (not shown), the second volume of ultrasonic couplant can flow therethrough to fill the second chamber 50. As shown, the second fluid channel 52 includes one or more dividers 52d separating the second fluid channel into a plurality of fluid passageways 52p FIG. 6A illustrates a cross-sectional view of the ultrasonic inspection apparatus 10 with the wear sole 40 coupled to the probe holder 20. As shown, the tab 44 of the wear sole 40 can extend within the slot 36 of the probe holder 20 to removably couple the wear sole 40 to the probe holder 20. Coupled in this manner, various features of the probe holder 20 and the wear sole 40 can be aligned with respect to one another to facilitate use.

When the ultrasonic probe 30 is mounted to probe holder 20 within the first chamber 22, the distal end 30d of the ultrasonic probe 30 can be positioned at a fixed distance and orientation with respect to the wear sole 40 and/or a target (e.g., a pipe 62). In certain embodiments, the probe holder 20 can be configured to permit adjustment of the fixed distance (e.g., along a z-direction) and/or an angle of orientation in one or more directions (e.g., rotation about an x-direction and/or y-direction). This mounting can provide a line of sight from the distal end 30d of the ultrasonic probe 30 to the distal surface 42d of the frame 42, through the membrane 48, without obstruction from the probe holder 20 or the frame 42.

Figure 6B:
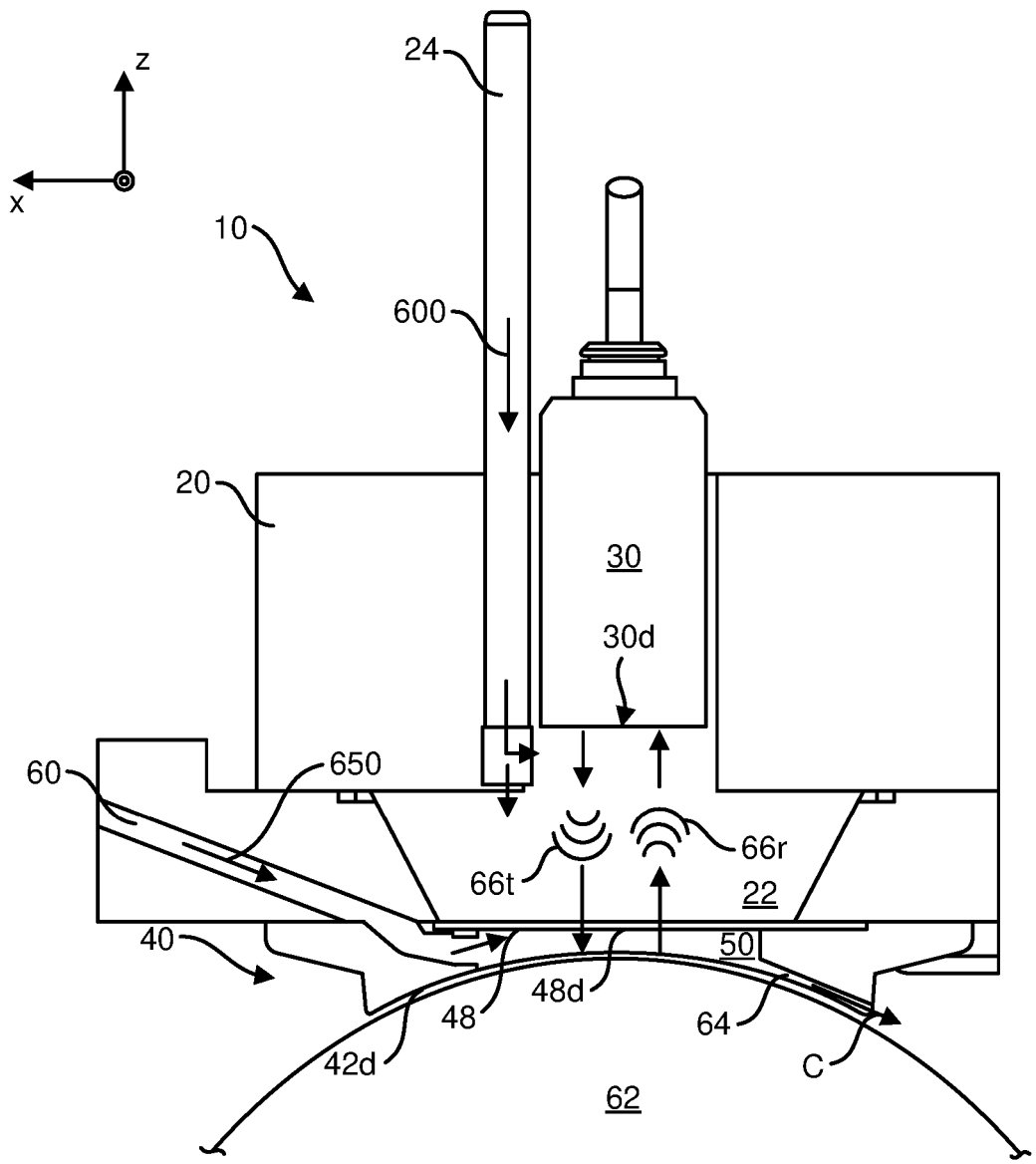

In another aspect, ends of the first and second fluid channels 26, 52 can be aligned across opposed surfaces of the probe holder 20 and the wear sole 40 to form a continuous fluid delivery channel 60. The fluid delivery channel 60 can allow an ultrasonic couplant to flow within the probe holder 20 and the frame 42 of the wear sole 40 to fill the second chamber 50. FIG. 6B illustrates a cross-sectional view of the ultrasonic inspection apparatus 10 positioned on a pipe 62 for performing an ultrasonic inspection. As shown, the distal surface 42d of the frame 42 of the wear sole 40 can be placed in contact with an outer surface of the pipe 62, distancing the distal end 30d of the ultrasonic probe 30 from an outer surface of the pipe 62. The first chamber 22 can be filled with the first volume of ultrasonic couplant via the first couplant supply 24 (arrow 600) and the second chamber 50 can be filled with the second volume of ultrasonic couplant via the fluid delivery channel 60 (arrow 650). When the distal end 20d of the probe holder 20 is sealingly engaged by the membrane 48, the first volume of ultrasonic couplant filling the first chamber 22 ($V_1$) can be substantially constant during inspection and movement of the ultrasonic inspection apparatus 10. The couplant flow 600 can be directed in one or more directions to facilitate removal of air bubbles and/or dirt from surfaces of the ultrasonic probe 30 and the membrane 48. As shown in FIG. 6A, this couplant flow can be directed towards and/or adjacent to the distal end 30d of the ultrasonic probe 30 (e.g., flow 600a) and/or a proximal facing surface 48p of the wear sole 40 (e.g., flow 600b).

In contrast to the first chamber 22, the second chamber 50 can be open to the distal surface 42d of the frame 42 and the pipe 62. When the distal surface 42d of the frame 42 is positioned on the pipe 62, the second chamber 50 can become distally bounded and the second volume of ultrasonic couplant received within the second chamber 50 ($V_2$) can flow into contact with the outer surface of the pipe 62. The couplant flow 650 received within the second chamber 50 can also be directed towards and/or adjacent to the outer surface of the pipe 62 and/or a distal-facing surface 48d of the wear sole 40. Similar to the couplant flow 600, the couplant flow 650 can facilitate removal of air bubbles and/or dirt from the outer surface of the pipe 62 and/or a distal-facing surface 48d of the wear sole 40.

Under the influence of gravity and/or flow pressure, the second volume of ultrasonic couplant can also flow out of the second chamber 50 via a third fluid channel 64 (arrow C). The third fluid channel 64 can be formed in the distal surface 42d of the frame 42 and positioned laterally opposite the second fluid channel 52. In certain embodiments (not shown), the third fluid channel can be formed with two or more slots. As an example, each of the slots can have approximately the same width.

Thus, an ultrasonic couplant received within the second fluid channel 52 can flow laterally through one side of the frame 42 including the second fluid channel 52, through the second chamber 50, and through to the opposite side of the frame 42 including the third fluid channel 64. To maintain the volume of the second chamber 50 ($V_2$) filled with the second volume of ultrasonic couplant, a continuous flow of ultrasonic couplant can be delivered to the second chamber 50 via the fluid delivery channel 60. In this manner, an optimized flow path can be formed by the first channel 26, the second fluid channel 52, and the third fluid channel 64 in combination with the second chamber 50.

Alternatively or additionally, the cross-sectional area of the second fluid channel 52 can be larger than the cross-sectional area of the third fluid channel 64. This configuration can facilitate retention of the second volume of ultrasonic couplant within the second chamber 50, as fluid flow out of the second chamber 50 is restricted relative to fluid flow into the second chamber.

Once the first and second chambers 22, 50 are filled with the first and second volumes of ultrasonic couplants, respectively, the ultrasonic probe 30 can transmit ultrasonic waves towards the pipe for inspection. Ultrasonic waves 66t transmitted by the ultrasonic probe 30 can propagate through the first volume of ultrasonic couplant within the first chamber 22, through the membrane 48, and through the second volume of ultrasonic couplant within the second chamber 50 to the pipe 62. At the pipe 62, ultrasonic waves 66r can be reflected from surface and/or internal boundaries of the pipe 62 back towards the ultrasonic probe 30, propagating through the second volume of ultrasonic couplant within the second chamber 50, the membrane 48, and the first volume of ultrasonic couplant within the first chamber 22. At the ultrasonic probe 30, characteristics of the reflected ultrasonic waves 66r can be measured (e.g., amplitude, propagation time, etc.) and transmitted to a computing device for storage and/or analysis for detection of defects within the pipe 62.

After the ultrasonic probe 30 has completed acquiring measurements for one pipe, the ultrasonic inspection apparatus 10 can be removed from contact with the pipe 62 and/or repositioned relative to the pipe 62. The second volume ultrasonic couplant ($V_2$) can drain from the second chamber 50, through the open distal surface 42d of the frame 42 when the pipe 62 is removed, while the first of ultrasonic couplant ($V_1$) within the first chamber 22 can be retained. The first and second chambers 22, 50 can be configured such that the volume $V_1$ is greater than the volume $V_2$ so that the first volume of ultrasonic couplant occupies the majority of the path through which the ultrasonic waves 66t, 66r travel between the distal end 30d of the ultrasonic probe 30 and the pipe 62. As an example, the ratio of $V_1$ to $V_2$ can be in the range of about 2 to 1, 3 to 1, 4 to 1, 5 to 1, 10 to 1, 20 to 1, 30 to 1, 40 to 1, etc. In a non-limiting example, the ratio of $V_1$ to $V_2$ can be in the range of about 34 to 1. Thus, when the ultrasonic inspection apparatus 10 is disengaged from a pipe and engaged with another pipe, the second volume of ultrasonic couplant within the second chamber 50 ($V_2$) is drained and the first volume of ultrasonic couplant within the first chamber 22 ($V_1$) is retained, reducing the filling time needed to prepare the ultrasonic inspection apparatus 10 for inspection of the next pipe as compared to a circumstance in which the first and second volumes of ultrasonic couplants ($V_1+V_2$) of both the first and second chambers 22, 50 are drained.

Figure 7:
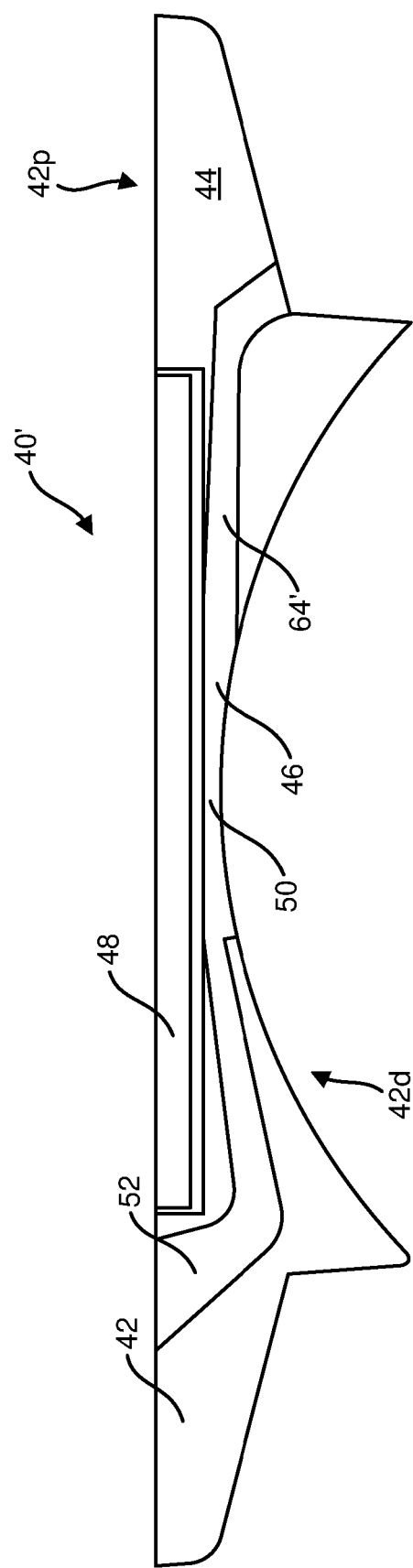
FIG. 7 is a cross-sectional view of another exemplary embodiment of a removable wear sole.

FIG. 7 is a cross-sectional view illustrating another exemplary embodiment of the removable wear sole 40 in the form of removable wear sole 40'. The wear sole 40' can be similar to wear sole 40, except that the third fluid channel 64 is replaced with third fluid channel 64'. Like the third fluid channel 64 of wear sole 40, the third fluid channel 64' of the wear sole 40' can be in fluid communication with the second chamber 50 and the distal surface 42d of the frame 42. Thus, the functionality and advantages discussed herein with respect to the third fluid channel 64 are also applicable to the third fluid channel 64'. However, in contrast to the third fluid channel 64, which can be formed in the distal surface 42d of the frame 42, the third fluid channel 64' can be formed within the bulk of the frame 42, where the terminal ends of the third fluid channel 64' can be in fluid communication with the second chamber 50 and the distal surface 42d of the frame 42.

Forming the third fluid channel 64' through the bulk of the frame 42 can be advantageous in operating environments where the wear sole is expected to undergo significant wear. Wear experienced by the wear sole can substantially remove some of the distal surface 42d of the frame 42. If the extent of this wear is extreme, it can potentially cause removal of a portion of the third fluid channel 64 and compromise the ability of the third fluid channel 64 to guide fluid exiting the second chamber 50. In contrast, forming the third fluid channel 64' through the bulk of the frame 42 can substantially avoid this issue.

Figure 8:
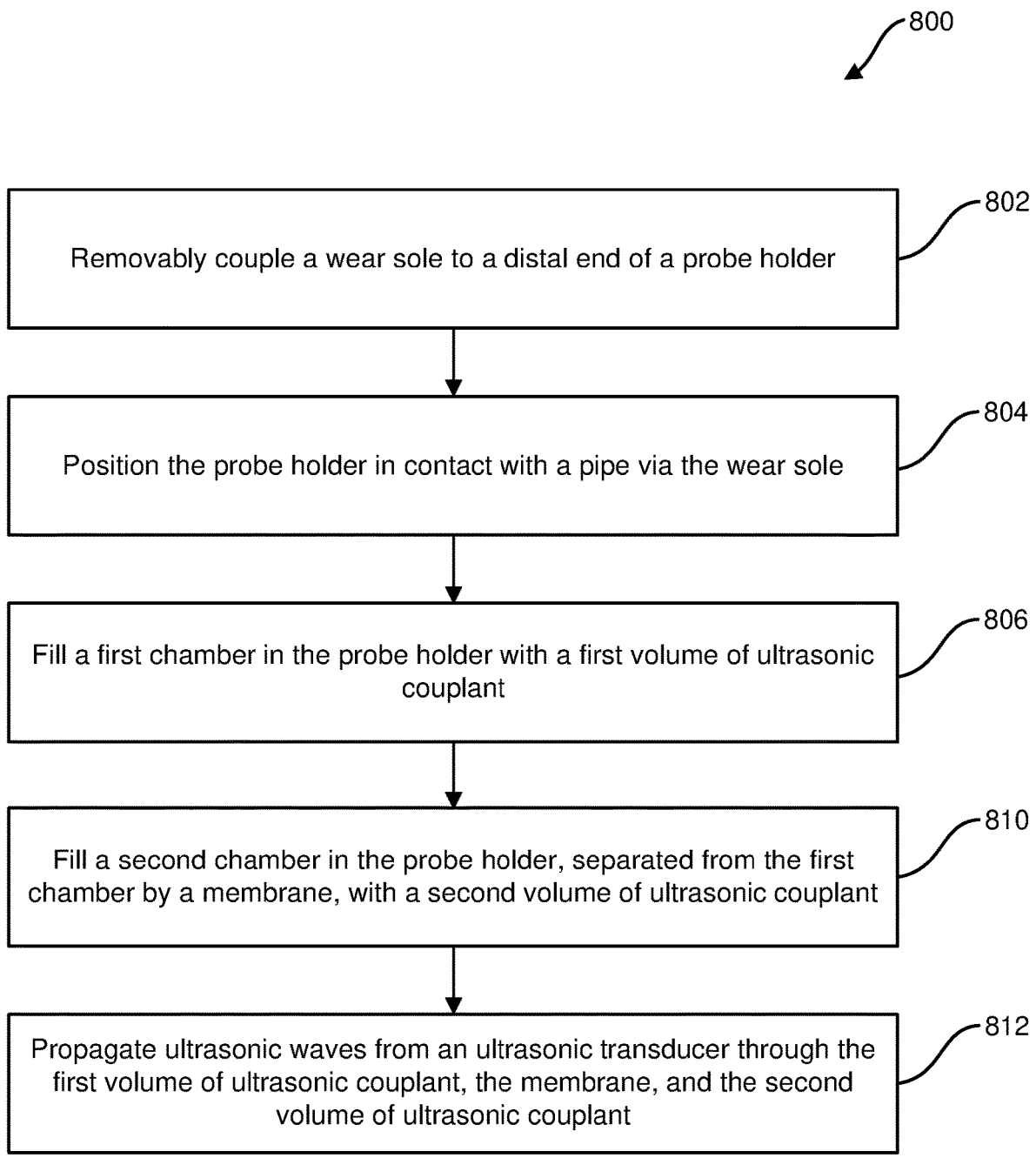
FIG. 8 is a flow diagram illustrating one exemplary embodiment of a method of ultrasonic inspection.

FIG. 8 is a flow diagram illustrating an exemplary embodiment of a method 800 for ultrasonic inspection. Embodiments of the method 800 are described below with reference to inspection apparatus 10. In certain aspects, embodiments of the method 800 can include greater or fewer operations than illustrated in FIG. 8 and can be performed in a different order than illustrated in FIG. 8.

In operation 802, a wear sole (e.g., 40, 40') can be removably coupled to a distal end (e.g., 20*d*) of a probe holder (e.g., 20).

In operation 804, the probe holder 20 can be positioned in contact with a pipe (e.g., 62) via the wear sole 40, 40'.

In operation 806, a first chamber (e.g., 22) of the probe holder 20 can be filled with a first volume of an ultrasonic couplant.

In operation 810, a second chamber (e.g., 50) can be filled with a second volume of ultrasonic couplant. The second chamber 50 can extend between the wear sole 40, 40' and the pipe 62. As an example, the wear sole 40, 40' can include a membrane (e.g., 48) that separates the first chamber 22 from the second chamber 50 and the second chamber 50 can extend from the membrane 48 and the pipe 62. The second volume of ultrasonic couplant can also be in fluid contact with the pipe 62. In certain embodiments, the second volume of fluid couplant can be delivered to the second chamber 50 by a fluid channel (e.g., 60) extending through the probe holder 20 and the wear sole 40, 40'.

The first and second volumes of ultrasonic couplant can have a variety of configurations. In one aspect, the first volume of ultrasonic couplant in the first chamber 22 can be greater than the second volume of ultrasonic couplant in the second chamber 50. In another aspect, the first volume of ultrasonic couplant can be approximately constant, while the second volume of ultrasonic couplant can be continuously delivered to the second chamber 50 to fill the second chamber 50.

In operation 812, ultrasonic waves generated by an ultrasonic transducer (e.g., 30) can be propagated through the first volume of ultrasonic couplant, through the membrane 48, and through the second volume of ultrasonic couplant to the pipe. The membrane 48 can be configured to propagate ultrasonic waves emitted by the ultrasonic probe 30. That is, the membrane 48 can be substantially transparent to ultrasonic waves.

Optionally, the method can also include removing a first wear sole from the probe holder and replacing the first wear sole with a second wear sole. The first and second wear soles can be substantially the same, except for wear experienced by the first wear sole during use.

In further embodiments, a method 900 is provided for forming the wear sole 40 on a layer-by-layer basis (e.g., additive manufacturing). As shown in FIG. 9, the method includes operations 902 and 904. The operations of method 900 are further discussed with regards to FIGS. 1-7 and 10A-10C. In certain embodiments, a goal of the method 900 can be one or more of cost reduction, increase of wear resistance, and weight reduction.

In operation 902, a plurality of layers are formed from at least one frame material. Adjacent layers of the plurality of layers can be bonded to one another to define the frame of the wear sole 40. The wear sole 40 formed in this manner can include the proximal surface 42*p*, the distal surface 42*d*, a frame body 42*b* extending between the proximal surface 42*p* and the distal surface 42*d*, the aperture 46, and one or both of the second fluid channel 52 and the third fluid channel 64.

As discussed above, the wear sole 40 can be coupled to the probe holder 20 and at least a portion of the distal surface 42*d* of the wear sole 40 can be placed into contact with the target (e.g., pipe 62). The second fluid channel 52 formed within the wear sole 40 can be configured such that the second volume of fluid couplant received by the second fluid channel 52 flows from the proximal surface 42*p* to the distal surface 42*d*. In certain embodiments, the second fluid channel 52 can be configured to cause the received second volume of fluid couplant to flow laminarly (e.g., non-turbulent) between the distal surface 42*d* and an outer surface of the target (e.g., pipe 62).

As an example, laminar flow can be created by the design of the wear sole 40. In one aspect, laminar flow between the distal surface 42*d* and an outer surface of the target can be achieved by avoiding formation of edges and corners within the second fluid channel 52. In another aspect, laminar flow between the distal surface 42*d* and an outer surface of the target can be achieved by keeping fluid flow in neighboring fluid passageways 52*p* at similar speeds (e.g., from about 1 m/s to about 3 m/s) prior to merging the fluid flow in the second chamber. In a further aspect, laminar flow between the distal surface 42*d* and an outer surface of the target can be achieved by elimination of boundaries within the second fluid channel that can create reverse flows (e.g., geometric discontinuities such as corners and spoilers and changes in cross-sectional area, In an additional aspect, laminar flow between the distal surface 42*d* and an outer surface of the target can be achieved by maintaining a trajectory of fluid flow at small deviations in angle (e.g., from about 0° to about 10°) with respect to a streamline direction of the main fluid stream. Laminar flow can also be created by iterative improvement with simulation, testing, and re-design.

Exemplary embodiments of the probe holder 20 and the wear sole 40 can be formed by additive manufacturing. Exemplary embodiments of the wear sole 40 are illustrated in FIGS. 10A-10C as wear soles 1000, 1020, 1040 and an exemplary embodiment of the probe holder is illustrated in FIG. 11.

Figure 10A:
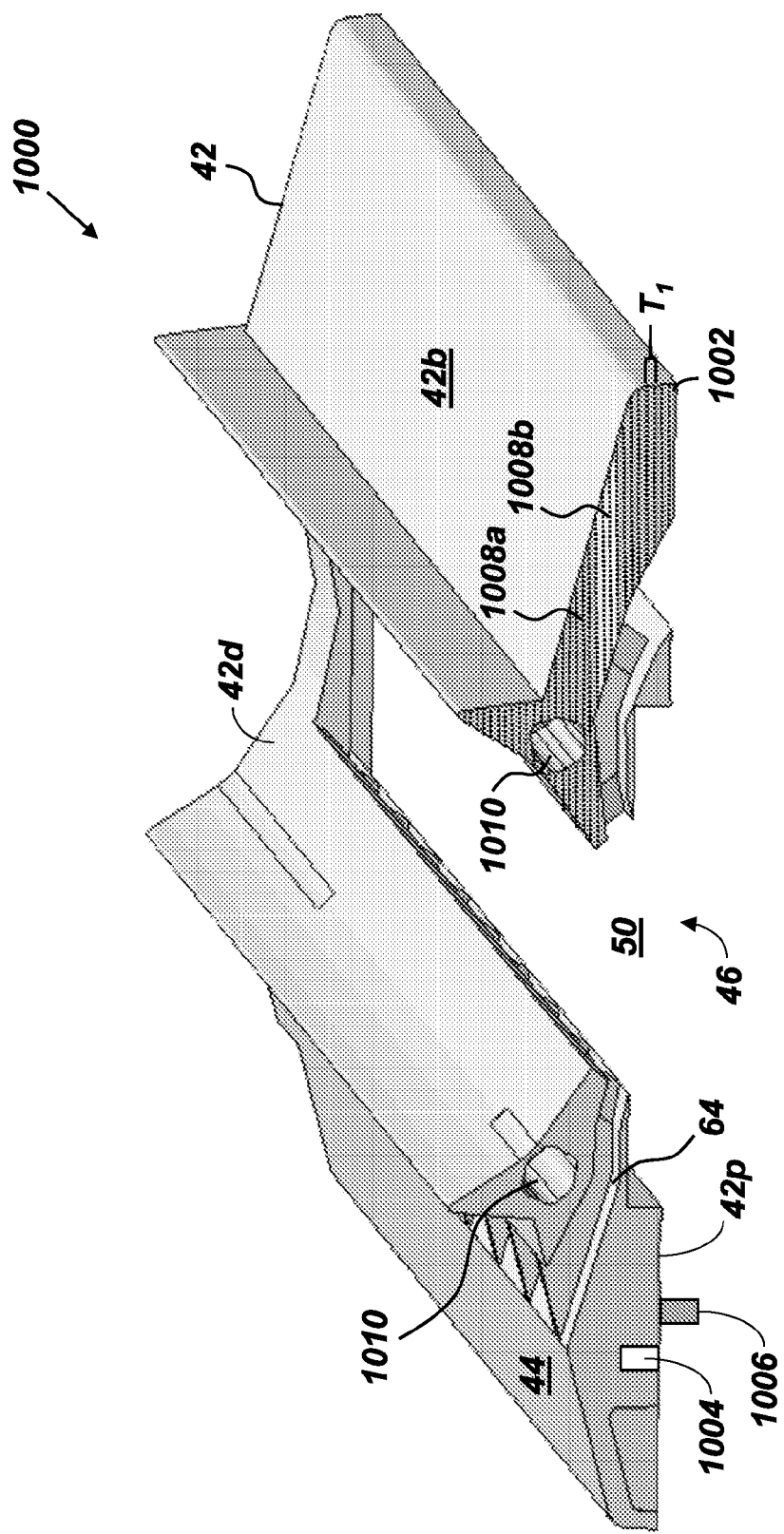
FIG. 10A is a perspective view illustrating one exemplary embodiment of a wear sole formed according to the method of FIG. 9 that includes cavities configured to receive wear resistant and/or reinforcing inlays, cavities for fluid guidance, and cavities configured for weight reduction.
Figure 10B:
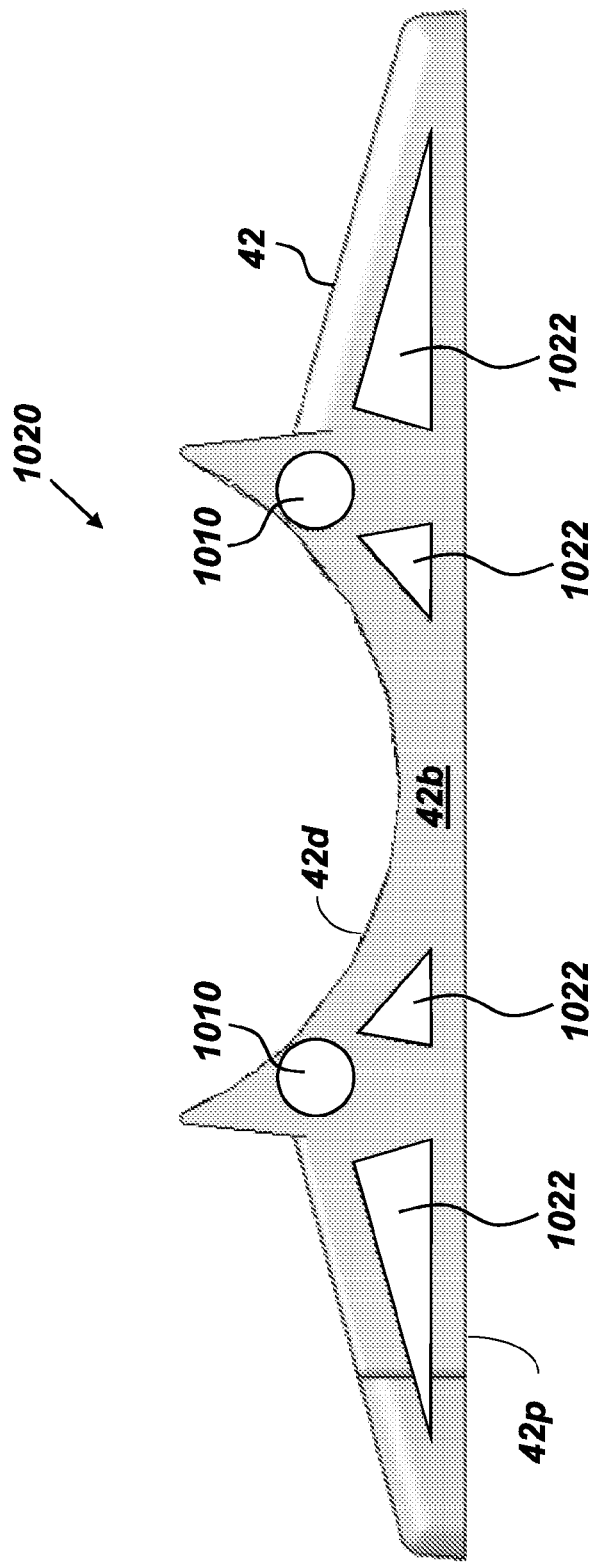
FIG. 10B is a side view illustrating another exemplary embodiment of a wear sole formed according to the method of FIG. 9 that includes cavities configured for reduced weight.
Figure 10C:
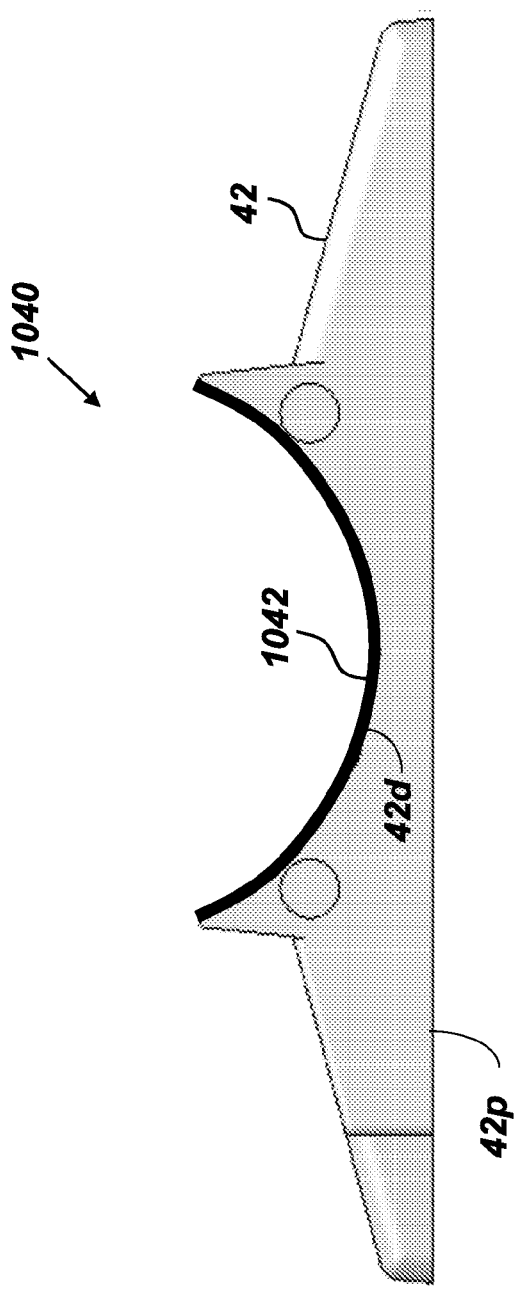
FIG. 10C is a side view illustrating a further exemplary embodiment of a wear sole formed according to the method of FIG. 9 that includes a wear resistive layer positioned on a distal surface.
Figure 11:
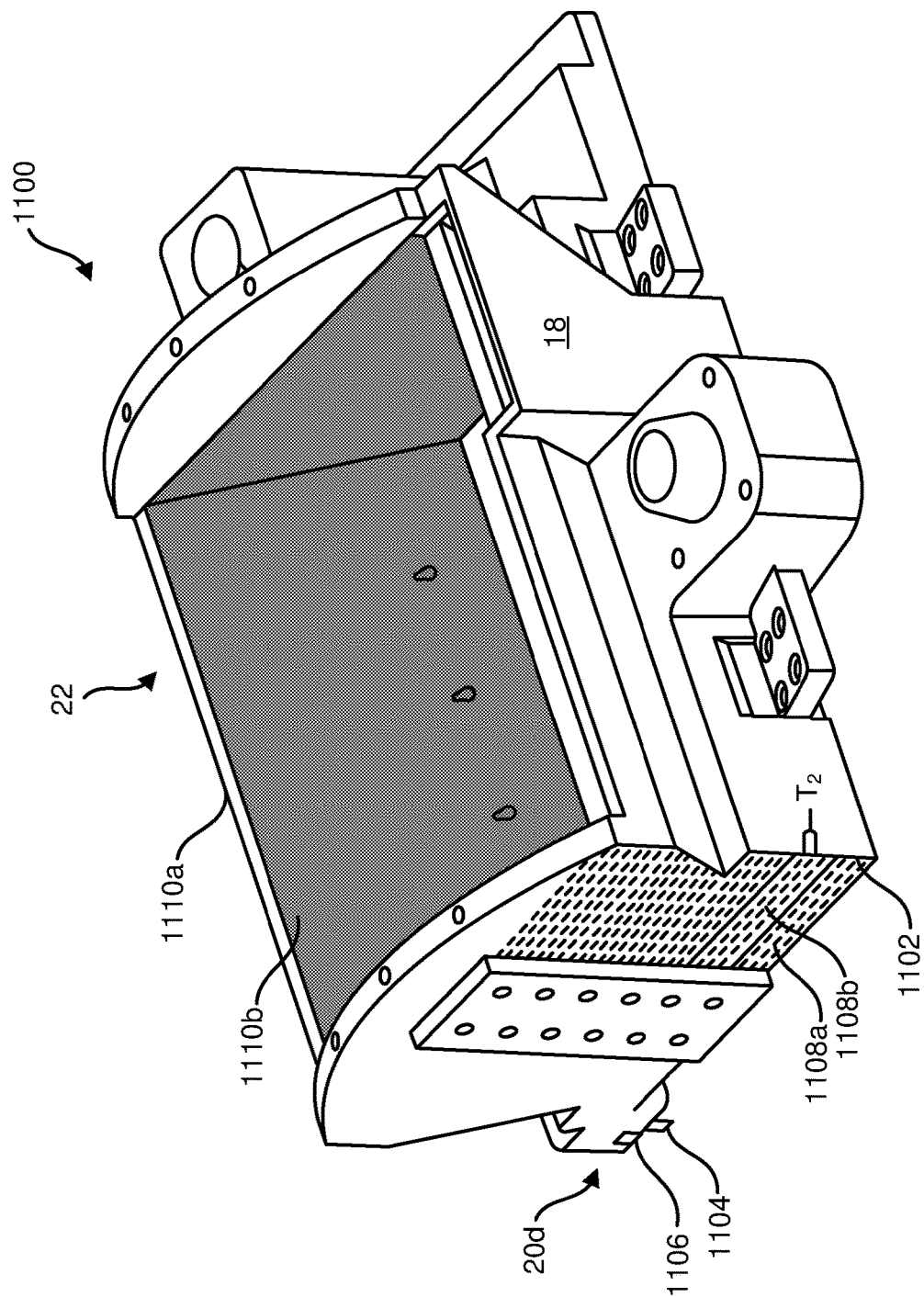
FIG. 11 is a perspective view illustrating one exemplary embodiment of a probe holder formed by an additive manufacturing technique and including a plurality of layers bonded to one another.

As shown in FIG. 10A, layers 1002 of predetermined shape can be formed upon one another in least one direction (e.g., a thickness direction) to define the frame 42. For clarity, the layers 1002 are not shown in FIGS. 10B-10C. Each of the wear soles 1000, 1020, 1040 includes the frame 42, the proximal surface 42*p*, the distal surface 42*d*, a frame body 42*b*, the aperture 46, the second fluid channel 52, and the third fluid channel 64.

A thickness $T_1$ of respective layers 1002 can be approximately the same or different from one another. In an embodiment, the thickness $T_1$ of each of the layers 1002 can be independently selected from the range of about 0.001 mm to about 0.5 mm.

The proximal surface 42*p* can be configured to secure the frame 42 to the distal end 20*d* of the probe holder 20. That is, the plurality of layers 1002 can define one or more attachment features that are configured to secure the frame 42 to the distal end 20*d* of the probe holder 20. As an example, the wear soles 1000, 1020, 1040 can include the tab 44 and the tab 44 can be received within the slot 36 of the probe holder 20 by an interference fit to secure the wear sole 1000 to the probe holder 20. In alternative embodiments, the attachment features can be formed on or adjacent to the proximal surface 42*p*. As an example, the attachment features can include recesses 1004 extending proximally from the proximal surface 42*p* (e.g., into the frame body 42*b*) and/or protrusions 1006 extending distally from the proximal surface 42*p*. The probe holder 20 can include mating features configured to engage such recesses and/or protrusions.

In an embodiment, the plurality of layers 1002 can be formed by one or more additive manufacturing techniques. Examples of additive manufacturing can include VAT photopolymerization, material jetting, binder jetting, material extrusion, powder bed fusion, sheet lamination, and directed energy deposition, alone or in any combination. Examples of the frame material can include, thermoplastics (e.g., polyamide [PA], acrylonitrile butadiene styrene [ABS], polylactic acid [PLA]), photopolymers (e.g., SU-8), and steels (e.g., stainless, copper, aluminum). The printed matrix can include any filling material that can increase strength, such as carbon fiber, glass fiber, Kevlar® (DuPont, Wilmington, Del., USA), etc.

In VAT photopolymerization, a substrate is lowered into a vat of liquid photopolymer resin by the layer thickness T. The resin is the frame material and, when exposed to ultraviolet (UV) light, is cured to form a first layer in a predetermined shape. Subsequently, the substrate is again lowered into the resin by layer thickness T and the ultraviolet (UV) light cures the resin to form a second layer in a predetermined shape which is positioned on top of, and bonded to, the first layer. This process of lowering the substrate into the frame material resin and curing the resin is repeated to form as many layers as is necessary to complete the frame 42.

In material jetting, a print head is positioned above a substrate. Droplets of the frame material are deposited from the print head in a predetermined shape onto the substrate. Following deposition, the droplets of the frame material solidify to form the first layer. Droplets of the frame material are subsequently deposited from the print head in a predetermined shape onto the first layer. Following deposition, the droplets of the frame material solidify to form the second layer in a predetermined shape which is positioned on top of, and bonded to, the first layer. This process of depositing and solidifying the frame material is repeated to form as many layers as is necessary to complete the frame 42.

In binder jetting, a powder of the frame material is spread over a substrate (e.g., using a roller). A print head then deposits a binder adhesive upon the powder in a predetermined shape to form the first layer. The substrate is then lowered by the layer thickness T and the process is repeated to form the second layer in a predetermined shape upon the first layer. This process of depositing the frame material powder and binder adhesive is repeated to form as many layers as is necessary to complete the frame 42. Examples of the binder can include, but are not limited to polymer adhesives.

In material extrusion, a first layer of the frame material is heated and deposited on a substrate by extrusion from an extrusion head (e.g., a nozzle) in a predetermined shape. A second layer of the frame material is similarly heated and deposited in a predetermined shape upon the first layer. Adjacent layers can be fused together upon deposition, as the extruded frame material is in a flowable state having a predetermined viscosity. (e.g., at least partially melted). This process of heating and extruding the frame material is repeated to form as many layers as is necessary to complete the frame 42. This process is repeated until the frame 42 is completely formed.

In powder bed fusion, a powder of the frame material is deposited on a substrate. A laser fuses the deposited frame material powder in a predetermined shape to form the first layer. A new layer of frame material powder is deposited upon the first layer and a laser fuses the deposited frame material powder in a predetermined shape to form the second layer. Adjacent layers can be bonded together upon fusion. This process of depositing and fusing the powder frame material is repeated to form as many layers as is necessary to complete the frame 42. Specific embodiments of powder bed fusion can include direct metal laser sintering (DMLS), electron beam melting (EBM), selective heat sintering (SHS), selective laser melting (SLM), and selective laser sintering (SLS).

In sheet lamination, sheets of the frame material are stacked and bonded to one another. The sheets can be cut to respective predetermined shapes and then bonded together or bonded together and then cut to a predetermined shape. Specific embodiments of sheet lamination can include ultrasonic additive manufacturing (UAM) and laminated object manufacturing (LOM).

In directed energy deposition, a multi-axis arm (e.g., 4-axis, 5-axis, etc.) equipped with a nozzle moves around an object that is fixed in place. The frame material is deposited from the nozzle (e.g., in a wire or powder form) onto existing surfaces of the object. Following deposition, the frame material can be melted using a laser, electron beam, or plasma arc and subsequently solidified in a predetermined shape to form the first layer. A new layer of frame material is deposited upon the first layer and is melted and solidified in a predetermined shape to form the second layer. Further layers are built up in like fashion, with cooling of each fused layer resulting bonding to the layer which underlies it. This process is repeated until the frame 42 is completely formed. Additive manufacturing can enable formation of wear soles exhibiting new features and designs. Examples of features that can be formed are illustrated in FIGS. 10A-10C.

In one embodiment, the plurality of layers 1002 can define a first region 1008*a* including a first frame material exhibiting a first acoustic property and a second region 1008*b* including a second frame material exhibiting a second acoustic property. The first and second regions 1008*a*, 1008*b* can occupy different locations within the frame and the first and second frame materials can be different materials.

Examples of the first and second frame materials can be independently selected from elastomers, polymers having a predetermined strength (e.g., tensile, compression, and/or bending strength from the range of about 10 MPa to about 80 MPa), steels, metal alloys, non-hardened steels, non-hardened metal alloys, non-cured (e.g., non-cross-linked) polymers.

The relative fractions of the first and second regions 1008*a*, 1008*b*, and their relative placement within the frame body 42*b*, can be configured to tailor one or more acoustic properties of the frame 42. Configurations of the first and second regions 1008*a*, 1008*b* can include one or more entire layers of the plurality of layers and portions thereof. The first and second regions 1008*a*, 1008*b* can be arranged in a continuous or discontinuous manner according to a predetermined pattern. Examples of arrangements of the first and second regions 1008*a*, 1008*b* can include patterns to create acoustic properties such as parallel structures or checked patterns. In certain embodiments, the first and second regions 1008*a*, 1008*b* can be configured to achieve acoustic attenuation within a range of normalized viscosities from about 2 MPa*s/m to about 10 MPa*s/m (e.g., by adjustment of their respective volume fractions). In further embodiments, acoustic impedance of the wear sole can vary from about 2.2 MRayl to about 3 MRayl (mega Rayleigh units of acoustic impedance).

In other embodiments, attenuation within a material can optionally be a function of a build direction. That is, a direction in which the layer containing the material is oriented with respect to the geometry of the wear sole 40. As an example, specific attenuation of a first frame material within the first region 1008a can vary from about 10 dB/cm to about 15 dB/cm and specific attenuation of a second frame material within the second region 1008b can vary from about 45 dB to about 55 dB, depending upon whether the build direction is to the side, bottom, or back of the wear sole 40. Advantageously, a 3D printing device forming the wear sole 40 can be configured to vary the build directions of different portions of the wear sole 40 to provide desired acoustic properties. It can be understood, however, that in alternative embodiments, acoustic properties of a given layer and/or the wear sole as a whole can be configured to vary in any direction of interest, regardless of whether or not that direction is the build direction.

As an example, the first region can include a layer formed from a fully bonded polymer material and the second region can include unbonded polymer powder. The first and second regions can be arranged in alternating fashion, with the first region of fully bonded polymer constraining the unbonded polymer powder of the second region. Such layers can be arranged in parallel layers, each having a thickness of about 1 mm. In this manner, the frame 42 can exhibit the acoustic property of almost full attenuation within a range of normalized viscosity from about 5 MPa*s/m to about 10 MPa*s/m.

In further embodiments, as shown in FIGS. 10A-10B, the plurality of layers can define at least one cavity within the frame body 42b.

In one aspect, at least one first cavity 1010 can be configured to receive a reinforcement material, different from the frame material (e.g., the first and/or second frame materials). In one embodiment, the reinforcement material can exhibit a greater strength (e.g., compressive strength, tensile strength, and/or bending strength) than the frame material. In this manner, strength of the frame 42 can be increased. As an example, the reinforcement material can exhibit a strength within the range from 100 MPa to about 4000 MPa. Examples of the reinforcement material can include carbon fiber, glass fiber, steel alloys, ceramic inlays, Kevlar® inlays, etc.

In another embodiment, the reinforcement material can exhibit a greater stiffness (e.g., elastic modulus) than the frame material. As an example, the reinforcement material can exhibit an elastic modulus within the range from 100 GPa to about 4000 MPa. Examples of reinforcement materials can include carbon fiber, glass fiber, steel alloys, ceramic inlays, Kevlar® inlays, etc. In this manner, a stiffness of the frame 42 can be increased.

In another aspect, the at least one first cavity 1010 can be dimensioned to receive a hardened material exhibiting specific wear properties. The hardened material can exhibit a greater wear resistance (e.g., hardness) than the frame material. In this manner, wear resistance and operating life of the wear sole can be increased. As an example, the hardened material can exhibit a hardness within the range from about 100 MPa to about 450 MPa. The hardened material can include one or more of hardened metals, ceramics, reinforced plastics, and combinations thereof. Further examples of hardened material can include ceramics (e.g., aluminum oxide), metals case hardened by nitriding, etc.

Embodiments of the method 900 can incorporate the reinforcement material into the frame body 42b in a variety of ways. In one aspect, the at least one first cavity 1010 can be formed as void space that is subsequently filled with the reinforcement material. In another aspect, the reinforcement material can be formed in-situ within the at least one first cavity 1010. That is, concurrently with the layers 1002.

Embodiments of the shape and placement of the at least one first cavity 1010 within the frame body 42b can be varied. In one aspect, the shape of the at least one first cavity 1010 can be round, elliptical, or polygonal. As shown in FIG. 10A, the at least one first cavity 1010 can possess a generally tubular shape (e.g., having a generally circular cross-section) extending along at least a portion of the length of the frame 42. The at least one first cavity 1010 can be positioned at close to the distal surface 42d (e.g., at a distance of about 0.1 mm to about 3 mm from the distal surface 42d) within the frame body 42b.

The at least one first cavity 1010 can occupy a predetermined fraction of the wear sole 1000, 1020. As an example, the at least one first cavity 1010 can occupy a fraction of the wear sole 1000, 1020 selected from the range of about 1 vol. % to about 10 vol. % on the basis of the total volume of the frame body 42b.

In another aspect, as illustrated in FIGS. 10A-10B, the plurality of layers can define at least one second cavity 1022 within the frame body 42b. The at least one second cavity 1022 can be an unfilled void space configured to reduce a weight of the frame 42 as compared to a comparable frame formed without the at least one second cavity 1022. In this manner, a weight of the wear sole 1000, 1020 can be reduced.

Embodiments of the shape and placement of the at least one second cavity 1022 within the frame body 42b can be varied. In one aspect, the shape of the at least one second cavity 1022 can be round, elliptical, or polygonal. As shown in FIG. 10B, the at least one second cavity 1022 can possess a generally tubular shape that extends along at least a portion of the length of the frame 42 (e.g., into the page) and possesses a generally triangular cross-section. The at least one second cavity 1022 can be positioned at any area within the frame body 42b.

The at least one second cavity 1022 can occupy a predetermined fraction of the wear sole 1000, 1020. As an example, at least one second cavity 1022 can occupy a fraction of the wear sole 1000, 1020 that is selected from the range of about 1 vol. % to about 50 vol. % on the basis of the total volume of the frame body 42b.

In another embodiment, illustrated in FIG. 10C, a hardened material 1042, different from the frame material, can be positioned on at least a portion of the distal surface 42d. As discussed above, the distal surface 42d can be configured to contact the target. As shown in FIG. 10C, the distal surface 42d can be curved and dimensioned to abut at least a portion of an outer surface of a curved target, such as a pipe. In other embodiments, the shape of the distal surface can be configured to mate with outer surfaces of targets having different shapes (e.g., flat, non-circular, etc.).

The hardened material 1042 can exhibit specific wear properties, such as greater wear resistance (e.g., hardness) than the frame material. As an example, the hardened material 1042 can exhibit a hardness within the range from about 160 GPa to about 450 GPa. The hardened material 1042 can include one or more of hardened metals, ceramics, reinforced plastics, and combinations thereof. Further examples of the hardened material 1042 can include carbon fiber, glass fiber, steel alloys, ceramics (e.g., aluminum oxide), metals case hardened by nitriding, etc. Non-hardened materials such as brass alloys can also be employed to improve wear properties. In this manner, wear resistance and operating life of the wear sole can be increased.

Embodiments of the method 900 can position the hardened material 1042 on the distal surface 42*d* in a variety of ways. In one aspect, after the frame 42 is formed from the plurality of layers, the hardened material 1042 can be positioned on at least a portion of the distal surface 42*d*. In another aspect, the hardened material 1042 can be formed in situ. That is, concurrently with the layers 1002 of the plurality of layers.

As shown in FIG. 10A, the aperture 46 extends through the proximal surface 42*p*, the frame body 42*b*, and the distal surface 42*d*. In operation 904 of the method 900, the membrane 48 can placed within the aperture 46. The membrane 48 can be coupled to the frame 42 by a substantially fluid-tight seal that inhibits passage of a fluid from the proximal surface 42*p* through the aperture 46.

So configured, the second fluid channel 52 can extend from the proximal surface 42*p* to the second chamber 50 extending laterally between the side walls of the aperture 46, extending proximally by a distal surface of the membrane, and distally by the intersection of the aperture 46 and the distal surface 42*d* of the frame 42.

The membrane 48 can be placed within the aperture 46 in a variety of ways. In one aspect, after the frame 42 is formed from the plurality of layers, the membrane 48 can be positioned within the aperture 46. An adhesive or other sealing mechanism can be employed to form the substantially fluid-tight seal. In another aspect, the membrane 48 can be formed in-situ. That is, concurrently with the layers 1002.

FIG. 11 illustrates an exemplary embodiment of the probe holder 20 in the form of probe holder 1100 formed according to any of the additive manufacturing techniques discussed above, alone or in any combination (e.g., VAT photopolymerization, material jetting, binder jetting, material extrusion, powder bed fusion, sheet lamination, and directed energy deposition). As shown, layers 1102 of predetermined shape and composition can be formed upon one another in least one direction (e.g., a thickness direction) to define the probe holder body 18 including the first chamber 22, first fluid channel 26, proximal portion 28*p*, and distal portion 28*d*. The composition of the layers 1102 can be independently selected from those discussed above with regards to the wear sole 40 (e.g., 1000, 1020, 1040). In certain embodiments, the proximal and distal portions of the probe holder can be integrally formed and the previously described joint and seals therebetween can be omitted.

A thickness T$_2$ of respective layers 1102 can be approximately the same or different from one another. In an embodiment, the thickness T$_1$ of each of the layers 1002 can be independently selected from the range of about 0.001 mm to about 0.5 mm. In certain embodiments, the thickness T$_2$ of the layers 1102 can be selected independently of the thickness T$_1$ of the wear soles 1000, 1020, 1040. In alternative embodiments, the thickness T$_2$ can be approximately equal to the thickness T$_1$.

The distal end 20*d* of the probe holder 1100 can be configured to secure the frame 42 thereto. As discussed above, the plurality of layers 1102 can define one or more mating features configured to engage recesses 1004 and/or protrusions 1006 of the wear soles 1000, 1020, 1040. The mating features can include protrusions 1104 extending distally from the distal end 20*d* and dimensioned for receipt within corresponding recesses 1004 and/or recesses 1006 extending proximally from the distal end 20*d* and dimensioned to receive corresponding protrusions 1006.

Additive manufacturing can also be employed to provide the probe holder 1100 with capabilities that can be difficult to achieve through conventional manufacturing. features and designs. Examples of features that can be formed are illustrated in FIGS. 10A-10C.

In one embodiment, the plurality of layers 1102 can define a one or more regions of the probe holder 1100 possessing tailored acoustic properties. As an example, first region 1108*a* can include a first probe holder material exhibiting a first acoustic property and a second region 1108*b* can include a second probe holder material exhibiting a second acoustic property. The first and second regions 1108*a*, 1108*b* can occupy different locations within the probe holder body 18 and the first and second holder materials can be the same or different materials. Furthermore, the first and second regions 1108*a*, 1108*b* can have different shapes.

Figure 12A:
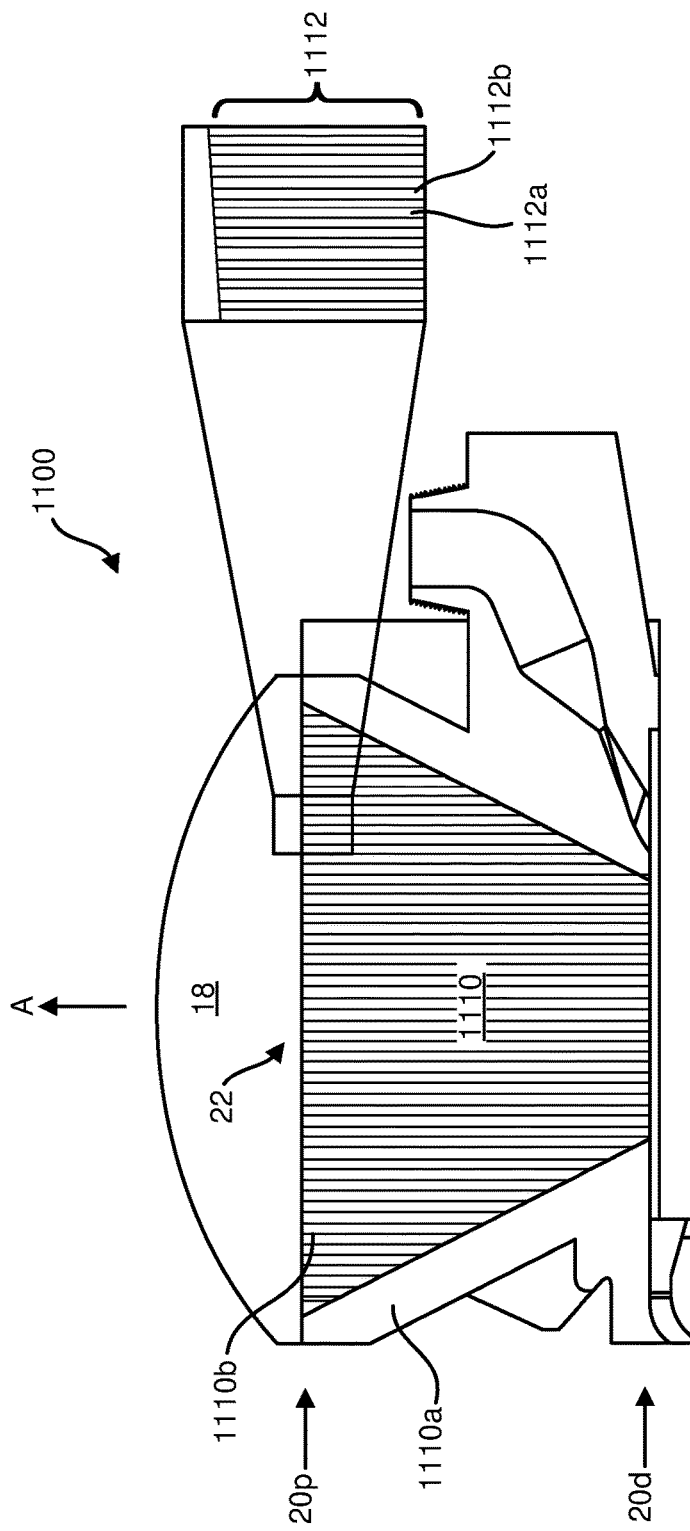
FIG. 12A is a side view illustrating a cross-section of the probe holder of FIG. 11.
Figure 12B:
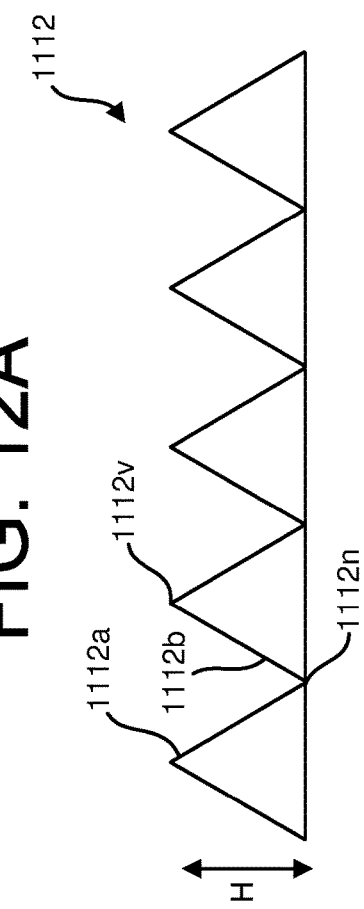
FIG. 12B is a side view illustrating one exemplary embodiment of a first geometric feature on an interior facing surface of a probe holder chamber.

In one embodiment, the first region can take the form of one or more exterior-facing surface 1110*a* of the probe holder body 18 and the second region 1108*b* can take the form of one or more interior-facing surfaces 1110*b* (e.g., sidewalls of the first chamber 22). The exterior facing surface 1110*a* can be configured to provide structural support for the probe holder body 18. The interior-facing surface 1110*b* can be configured to absorb at least a portion of incident ultrasound waves. The interior-facing surface 1010*b* can include microstructural features 1112 that absorb incident ultrasound waves. An example of the microstructural features 1112 is illustrated in FIGS. 12A-12B and FIG. 12A inset in the form of first triangular cuts. As shown, the first triangular cuts can be formed in a saw-tooth-like configuration, with angled sidewalls 1112*a*, 1112*b* intersecting at nadir 1112*n* and vertex 1112*v*. The first triangular cuts can be approximately straight lines and extending substantially parallel to a predetermined axis A (e.g., straight rows extending upwards from the distal end 20*d*). A height H of the first triangular cuts In another embodiment, the interior-facing surface 1110*b* can include macrostructural features 1114 that reduce reflection of unwanted incident ultrasound waves. An example of the macrostrutural features 1114 is illustrated in FIGS. 13A-13B in the form of second triangular cuts. As shown, the second triangular cuts can also be formed in a saw-tooth like configuration with angled sidewalls 1114*a*, 1114*b* intersecting at nadir 1114*n* and vertex 1114*v*. In contrast to the first triangular cuts, the second triangular cuts can be formed in curved rows extending longitudinally (e.g., in a right-left direction) and/or horizontally (e.g., in an up-down direction). The distance separating these longitudinal and horizontal rows can be larger than that of the first triangular cuts. Furthermore, a height h of respective "teeth" of the triangular cuts can vary.

The microstructural features 1112 and macrostrutural features 1114 can be integrally formed with the probe holder body 18 of the probe holder 1100. In contrast, conventional manufacturing techniques can adhere a layer of material containing ultrasound absorbing features to the probe holder body 18 to provide an inward facing surface having ultrasound absorbing properties. However, such adhesives can degrade over time, requiring periodic inspection and reapplication. Furthermore, it can be difficult to optimize ultrasound absorption at certain angles for such layers. Thus, ultrasound incident on these adhered layers can reflect strongly at certain angles, and can be measured as noise.

Figure 14A:
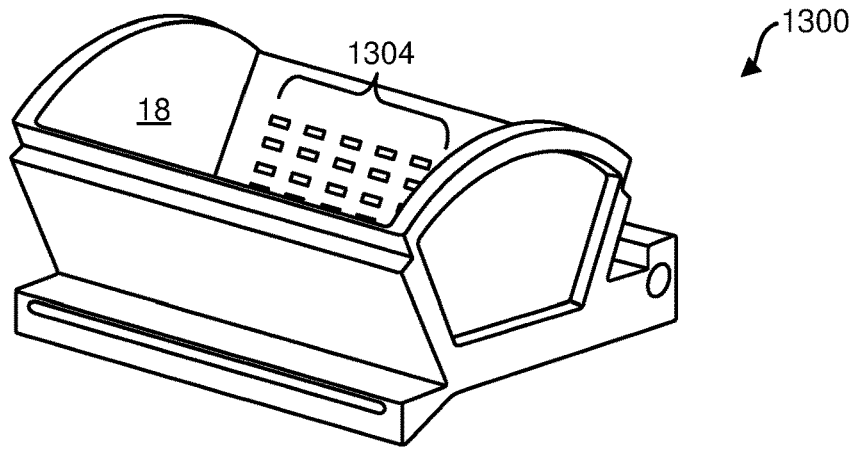
FIG. 14A is a perspective view of an exemplary embodiment of the probe holder including one or more hollow sidewalls and a plurality of outlets.
Figure 14B:
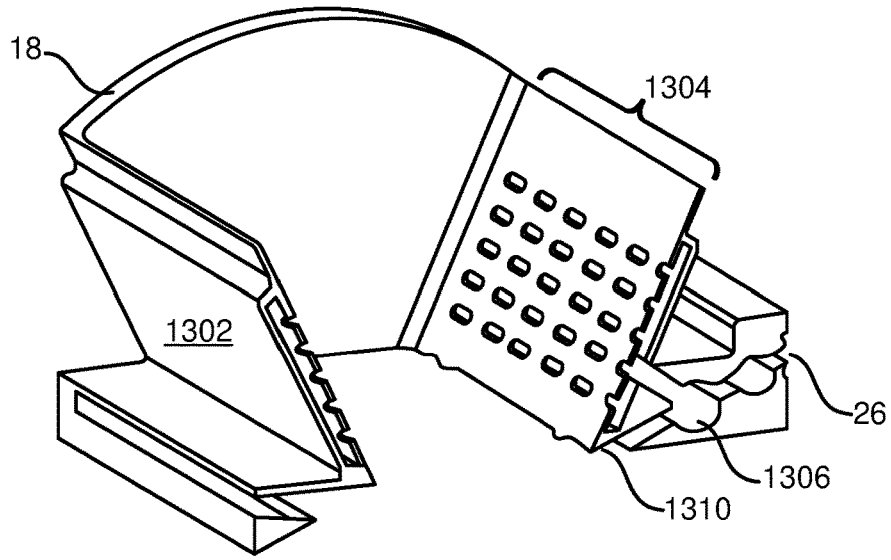
FIG. 14B is a perspective, cross-sectional view of the probe holder of FIG. 14A.
Figure 14C:
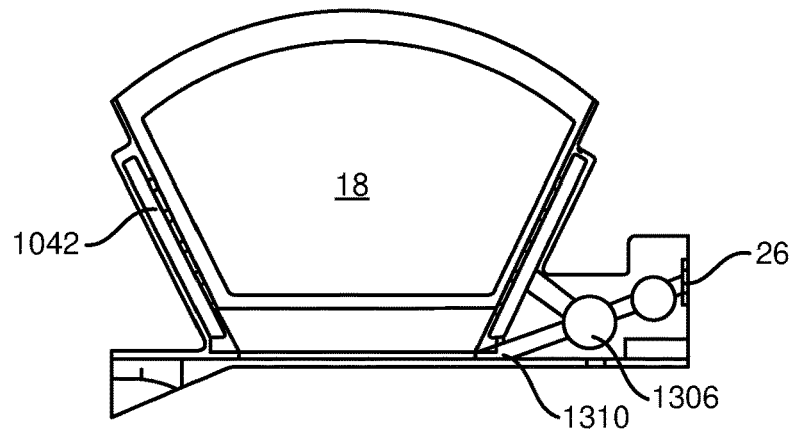
FIG. 14C is a side view of the probe holder of FIG. 14A.

Embodiments of the probe holder 20 can also be configured to create laminar (e.g., non-turbulent) flow of fluid couplant into the first chamber 22, while maintaining a relatively high flow rate. FIGS. 14A-14C illustrate probe holder 20 in the form of probe holder 1300 including probe holder body 18 formed with one or more hollow sidewalls 1302 and a plurality of outlets 1304 on the interior-facing surface 1110 of the first chamber 22. As shown, the plurality of outlets 1304 can placed in fluid communication with the first fluid channel 26 via a branch 1306. The branch 1306 can extend at least a portion of the length of the first chamber 22.

Figure 15A:
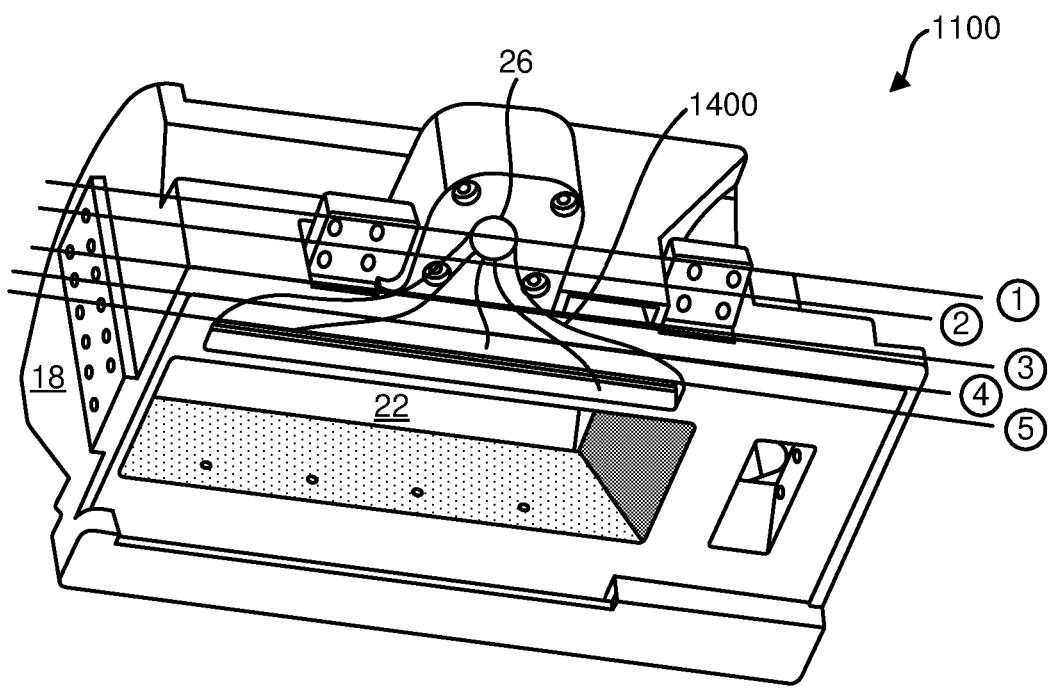
FIG. 15A is a bottom-up perspective view of the probe holder of FIG. 14A.
Figure 15B:
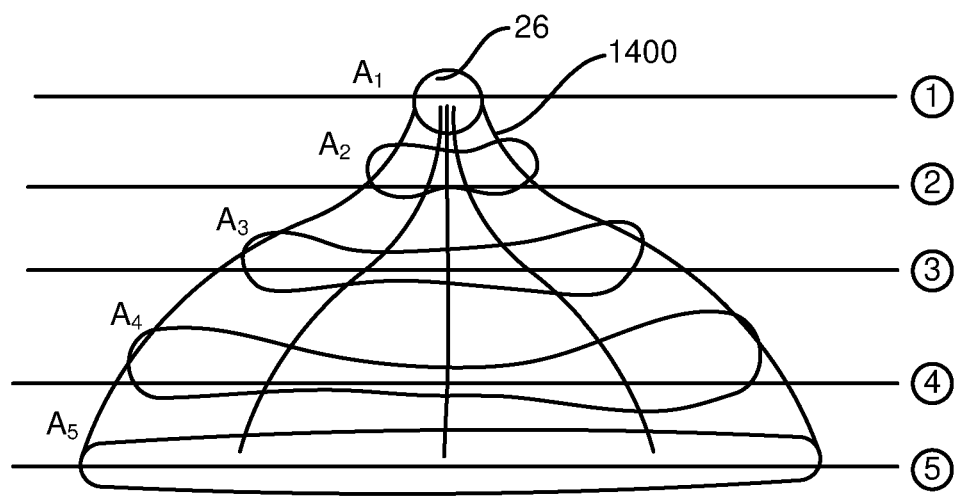
FIG. 15B is a schematic illustrate of a cross-sectional area of a fluid channel extending through a portion of the probe holder body and approaching a distal end of the probe holder.

Embodiments of the wear sole 40 formed by additive manufacturing can also be configured to take advantage of similar principles. Discussed above, the probe holder 20 can include a first fluid channel 26 and, when the probe holder 20 is coupled to the wear sole 40, fluid couplant can flow through the first fluid channel 26 for delivery to the distal end 20d and receipt by the wear sole 40. Accordingly, the first fluid channel 26 can be configured with an increasing cross-sectional area (e.g., $A_1$-$A_5$) along its length, distally of the branch 1306 and approaching the distal end 20d and wear sole 40 (e.g., positions −1-5), as illustrated in FIGS. 15A-15B. As an example, this distal portion of the first fluid channel 26 can be in the form of a slit 1400 that increases in cross-sectional area. In this manner, fluid couplant delivered via the first channel 26 to the second channel 52 of the wear sole 40 can flow laminarly. The second fluid channel 52 at the proximal end 40p of the wear sole 40 can be formed in a mating geometry to receive the laminar flow. Furthermore, couplant can be substantially equally distributed along the probe holder 1100, the ultrasonic probe 30, the wear shoe (e.g., 20, 1000, 1020, 1040), and the membrane 48.

Exemplary technical effects of the methods, systems, and devices described herein include, by way of non-limiting example, the ability to direct ultrasonic couplants from a probe holder through a wear sole of an ultrasonic inspection apparatus, a reduction in inspection delays arising from replacement of drained ultrasonic couplants, and rapid replacement of the wear sole. Through the use of additive manufacturing techniques, wear soles can be formed at lower cost and with improved properties (e.g., wear resistance, weight reduction, etc.) Probe holders can also be formed through additive manufacturing at reduced cost. A total number of parts and weight can be reduced while concurrently reducing ultrasound noise and optimizing couplant flow to minimize and/or substantially eliminate turbulence.

Certain exemplary embodiments have been described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method, comprising:
forming a plurality of layers from at least one body material, wherein adjacent ones of the plurality of layers are bonded to one another to define a body of an ultrasonic probe holder including:
a distal end configured to secure the body to a proximal end of a wear sole including a first cavity arranged in a frame body of the wear sole, the first cavity extending parallel to a longitudinal axis of the holder and containing a reinforcement material of greater hardness than a material of the frame body;
a chamber configured to receive an ultrasonic probe and a first volume of ultrasonic couplant, wherein the plurality of layers define at least one interior-facing surface of the chamber, the interior facing surface including first cut forming a saw tooth configuration configured to absorb at least a portion of ultrasonic waves incident thereon; and
a fluid channel extending through a portion of the body to the distal end and configured to receive a flow of fluid couplant.

2. The method of claim 1, wherein the plurality of layers further define an exterior facing surface configured to provide structural support.

3. The method of claim 1, wherein the first cuts in the saw tooth configuration are configured to extend approximately straight and parallel to the interior facing surface.

4. The method of claim 3, wherein the interior facing surface further includes second cuts that are curved with respect to the interior facing surface.

5. The method of claim 1, wherein the plurality of layers define one or more attachment features formed on or adjacent to the distal end and configured to secure the probe holder to the distal end of the wear sole.

6. The method of claim 1, wherein the plurality of layers define a plurality of outlets on at least one interior-facing surface of the chamber in fluid communication with the fluid channel via a branch.

7. The method of claim 6, wherein a cross-sectional area of the fluid channel positioned distally of the branch increases as the fluid channel approaches the distal end.

8. The method of claim 1, wherein the fluid couplant received by the fluid channel is directed to the chamber and flows into the chamber laminarly.

9. The method of claim 1, wherein the fluid couplant received by the fluid channel is directed to the distal end and flows out of the distal end laminarly.

10. A system, comprising:
a plurality of layers forming at least one body material, wherein adjacent ones of the plurality of layers are bonded to one another to define a body of an ultrasonic probe holder including:
a distal end configured to secure the body to a proximal end of a wear sole including a first cavity arranged in a frame body of the wear sole, the first cavity extending parallel to a longitudinal axis of the holder and containing a reinforcement material of greater hardness than a material of the frame body;
a chamber configured to receive an ultrasonic probe and a first volume of ultrasonic couplant, wherein the plurality of layers define at least one interior-facing surface of the chamber, the interior facing surface including first cuts forming any of a saw tooth configuration and/or an array of openings configured to absorb at least a portion of ultrasonic waves incident thereon; and
a fluid channel extending through a portion of the body to the distal end and configured to receive a flow of fluid couplant.

11. The system of claim 10, wherein the plurality of layers further define an exterior facing surface configured to provide structural support.

12. The system of claim 10, wherein the first cuts in the saw tooth configuration are configured to extend approximately straight and parallel to the interior facing surface.

13. The system of claim 12, wherein the interior facing surface further includes second cuts that are curved with respect to the interior facing surface.

14. The system of claim 10, wherein the plurality of layers define one or more attachment features formed on or adjacent to the distal end and configured to secure the probe holder to the distal end of the wear sole.

15. The system of claim 10, wherein the plurality of layers define a plurality of outlets on at least one interior-facing surface of the fluid chamber in fluid communication with the fluid channel via a branch.

16. The system of claim 15, wherein a cross-sectional area of the fluid channel positioned distally of the branch increases as the fluid channel approaches the distal end.

17. The system of claim 10, wherein the fluid couplant received by the fluid channel is directed to the chamber and flows into the chamber laminarly.

18. The system of claim 10, wherein the fluid couplant received by the fluid channel is directed to the distal end and flows out of the distal end laminarly.

* * * * *